United States Patent
Kim et al.

(10) Patent No.: US 10,462,526 B2
(45) Date of Patent: Oct. 29, 2019

(54) DISPLAY DEVICE

(71) Applicant: LG ELECTRONICS INC., Seoul (KR)

(72) Inventors: Uniyoung Kim, Seoul (KR); Goeun Lee, Seoul (KR); Ryunghwa Rhee, Seoul (KR); David Kempe, Santa Clara, CA (US); Keith Weng, Santa Clara, CA (US); Colin Zhao, Santa Clara, CA (US); Mercedes Mapua, Santa Clara, CA (US); Brian Behnke, Santa Clara, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/548,891

(22) PCT Filed: Jan. 28, 2016

(86) PCT No.: PCT/KR2016/000923
§ 371 (c)(1),
(2) Date: Aug. 4, 2017

(87) PCT Pub. No.: WO2016/126048
PCT Pub. Date: Aug. 11, 2016

(65) Prior Publication Data
US 2018/0020259 A1    Jan. 18, 2018

(30) Foreign Application Priority Data

Feb. 6, 2015    (KR) .................... 10-2015-0018500
Feb. 12, 2015    (KR) .................... 10-2015-0021432

(51) Int. Cl.
*H04N 21/475* (2011.01)
*H04N 21/4227* (2011.01)
(Continued)

(52) U.S. Cl.
CPC ..... *H04N 21/4755* (2013.01); *H04N 21/4227* (2013.01); *H04N 21/42204* (2013.01);
(Continued)

(58) Field of Classification Search
CPC .......... H04N 21/47217; H04N 21/482; H04N 21/2187; H04N 21/431; H04N 21/4755;
(Continued)

(56) References Cited

U.S. PATENT DOCUMENTS 6,141,003 A * 10/2000 Chor .................. H04N 5/44543
                                                           715/719
8,584,165 B1 * 11/2013 Kane .................. H04N 21/2225
                                                            725/44
(Continued)

FOREIGN PATENT DOCUMENTS

CN    101867747 A    10/2010
CN    102186118 A    9/2011
(Continued)

*Primary Examiner* — Kunal Langhnoja
(74) *Attorney, Agent, or Firm* — Birch, Stewart, Kolasch & Birch, LLP

(57) ABSTRACT

A display device according to an embodiment of the present invention comprises: a display unit configured to display a plurality of icons; an input interface unit configured to receive a request from a remote control device to control the operation of the display device; and a control unit configured to control the display unit and the input interface unit, wherein the control unit configured to play a broadcast program, and if a favorites icon from among the plurality of icons is selected during playback of the broadcast program, display one or more of a favorites channel list and a favorites program list.

15 Claims, 41 Drawing Sheets

(51) Int. Cl.
*H04N 21/4722* (2011.01)
*H04N 21/482* (2011.01)
*H04N 21/422* (2011.01)
*H04N 21/472* (2011.01)

(52) U.S. Cl.
CPC ....... *H04N 21/475* (2013.01); *H04N 21/4722* (2013.01); *H04N 21/47202* (2013.01); *H04N 21/482* (2013.01); *H04N 21/4828* (2013.01)

(58) Field of Classification Search
CPC ......... H04N 21/4828; H04N 21/47202; H04N 21/42204; H04N 21/4227; H04N 21/475; H04N 21/4722
See application file for complete search history.

(56) References Cited

U.S. PATENT DOCUMENTS

| 9,532,111 B1* | 12/2016 | Christie | H04N 21/4826 |
|---|---|---|---|
| 2002/0078457 A1 | 6/2002 | Nishikawa et al. | |
| 2009/0204929 A1 | 8/2009 | Baurmann et al. | |
| 2010/0281506 A1 | 11/2010 | Schmidt et al. | |
| 2011/0214146 A1* | 9/2011 | Hong | H04N 5/44543 725/46 |
| 2012/0054803 A1 | 3/2012 | Lee et al. | |
| 2012/0192218 A1 | 7/2012 | Schwesinger et al. | |
| 2013/0047174 A1 | 2/2013 | Lee et al. | |
| 2015/0020100 A1* | 1/2015 | Stark | H04N 21/482 725/40 |

FOREIGN PATENT DOCUMENTS

| EP | 2244472 A1 | 10/2010 |
|---|---|---|
| GB | 2323489 A | 9/1998 |
| KR | 10-2010-0115547 A | 10/2010 |
| WO | WO 2010/079907 A2 | 7/2010 |
| WO | WO 2012/134249 A3 | 12/2012 |
| WO | WO 2014/123303 A1 | 8/2014 |

* cited by examiner

FIG. 8
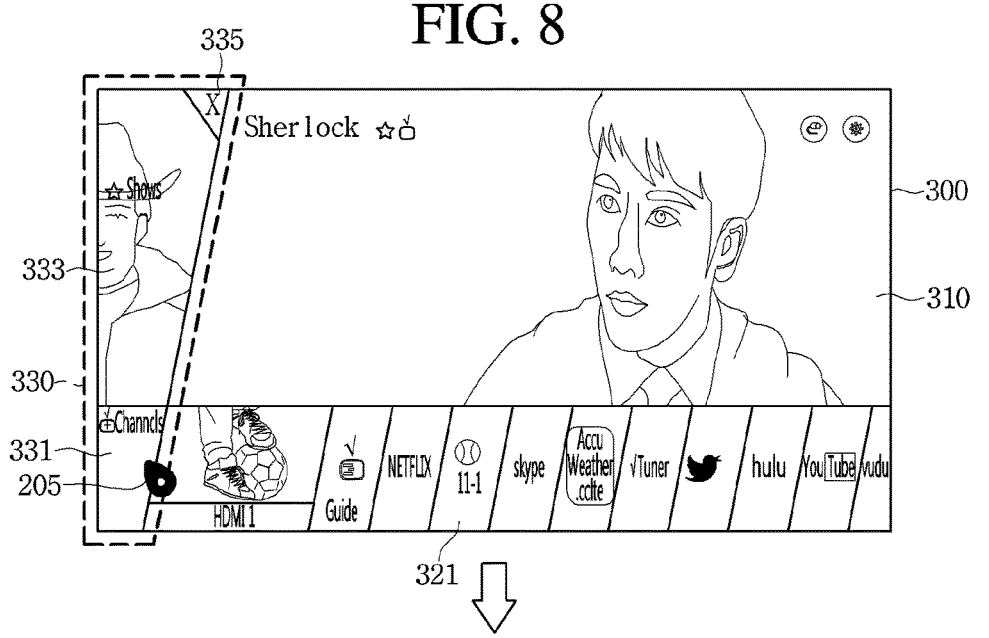
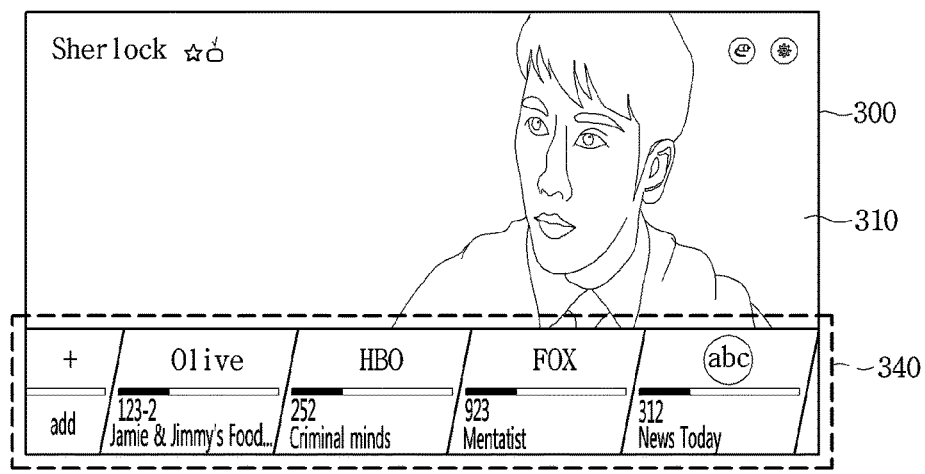

FIG. 17
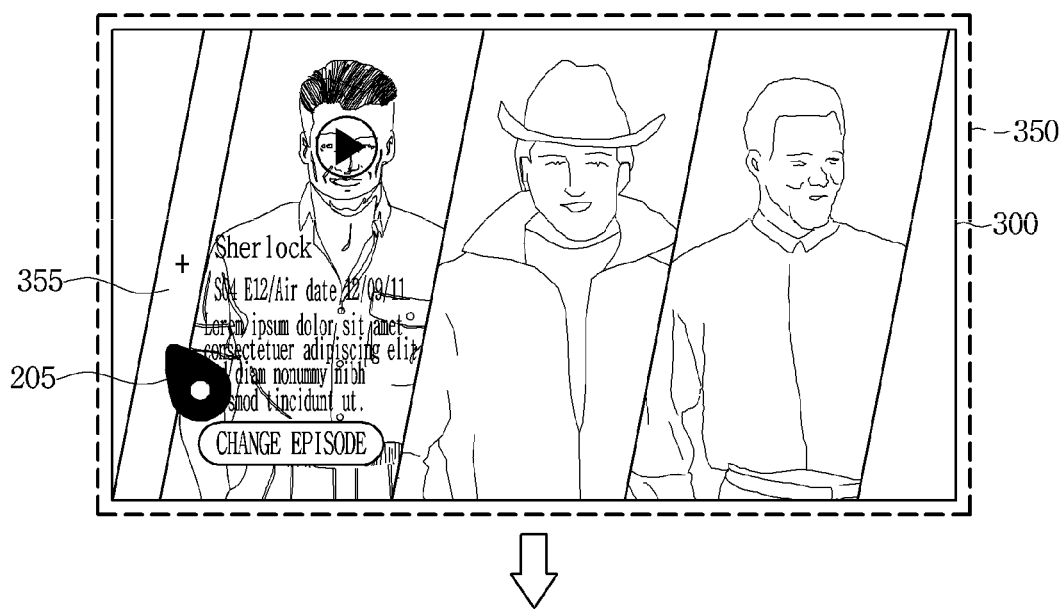

FIG. 23
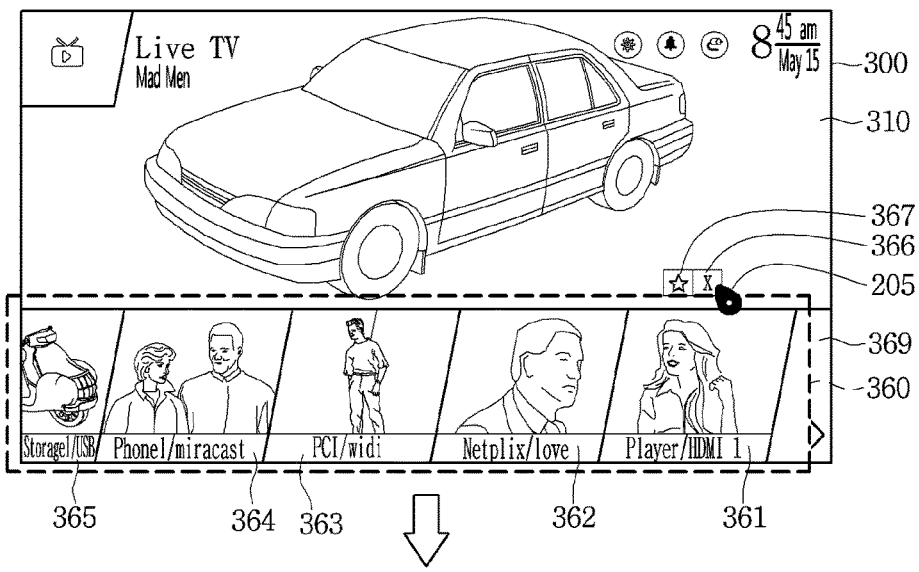
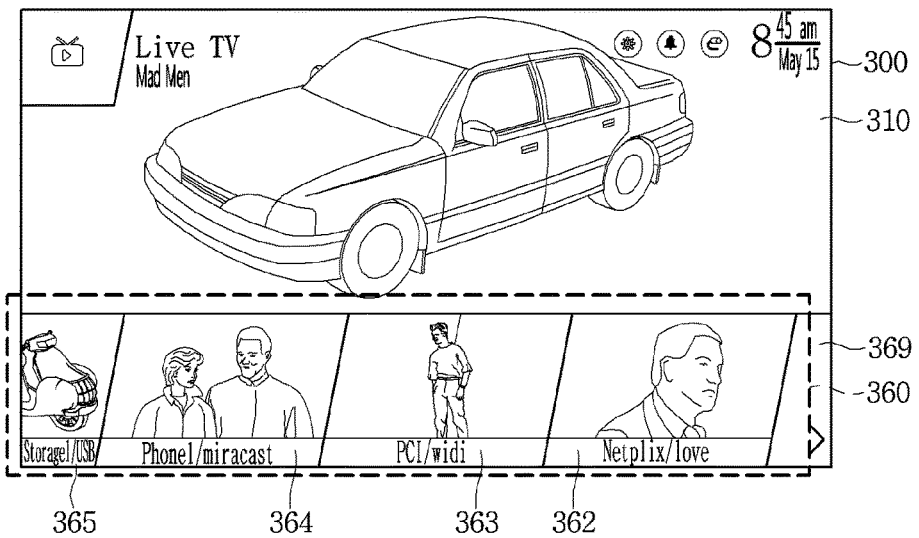

FIG. 24
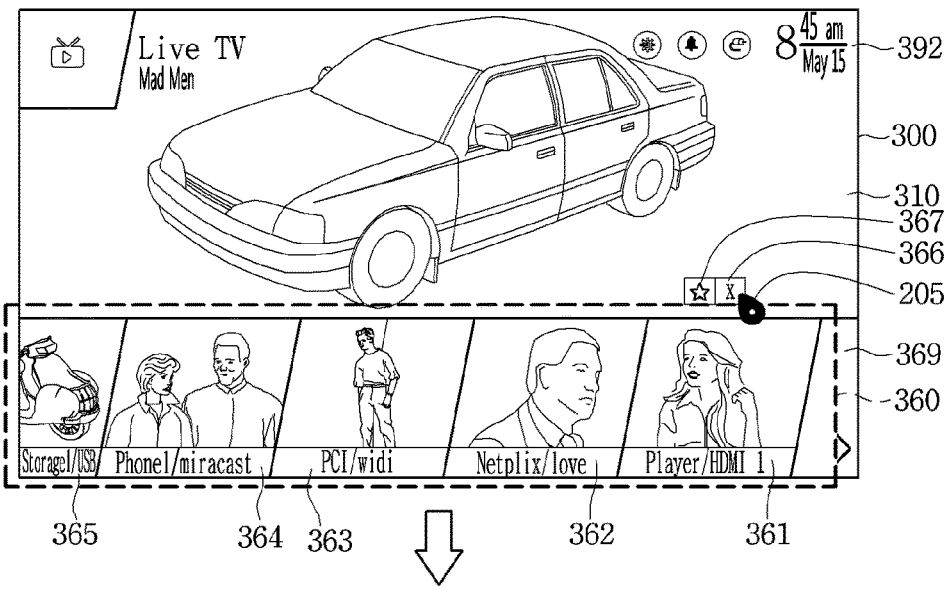
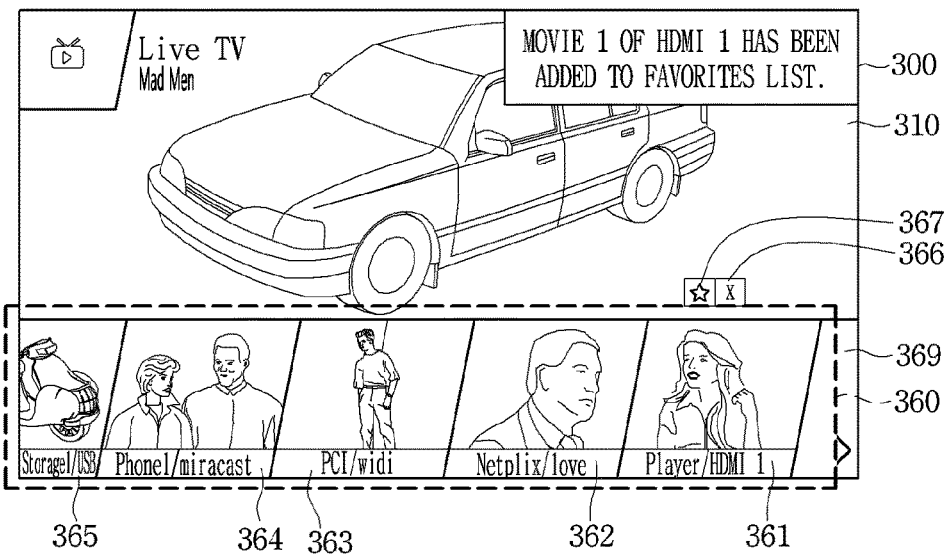

FIG. 34
3350
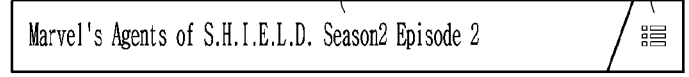
(a)
3350
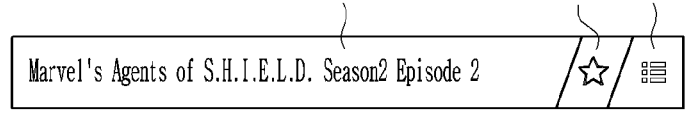
(b)

FIG. 35
3560
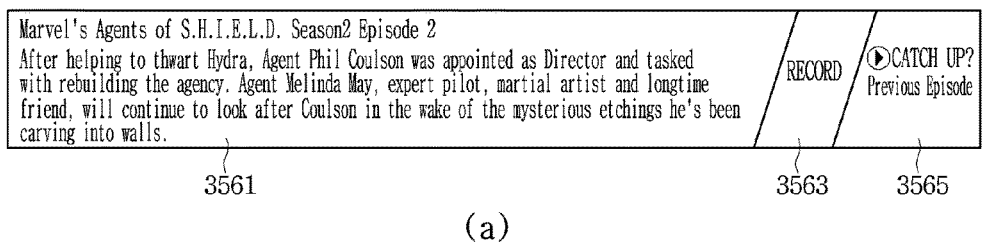
(a)
560
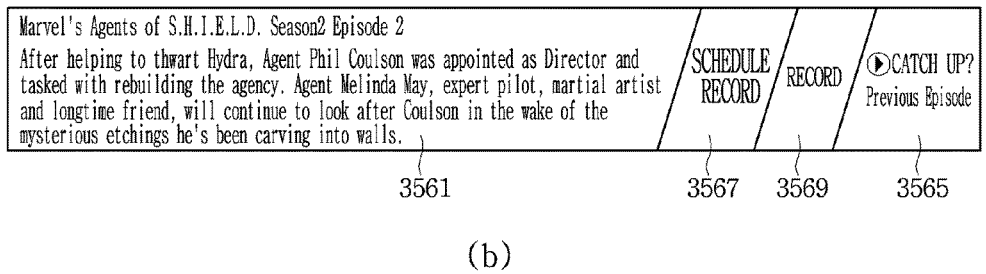
(b)

FIG. 38
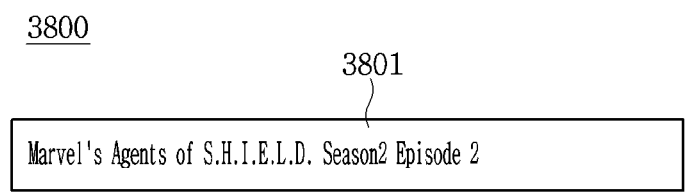
(a)
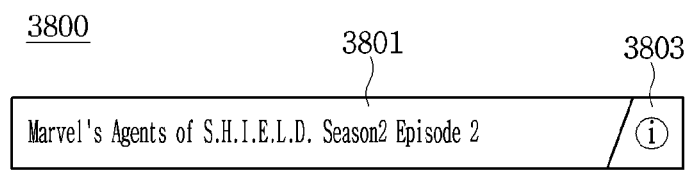
(b)

| The ree of Life Season 6 Episode 2 Dan is free and happy now that he can visit and spoil Jamie. Nathan now accepts the news bt still hates his father. He considers joining Owen in a 'slamball' team (basketball on trampolines), which seems dangerous for his spine. Lucas' book tour starts in Omaha where only Mouth is interested or indeed interesing, the real bad news follows. | RECORD |

3901                                                                                                                3903

(a)

3900

| The ree of Life Season 6 Episode 2 Dan is free and happy now that he can visit and spoil Jamie. Nathan now accepts the news bt still hates his father. He considers joining Owen in a 'slamball' team (basketball on trampolines), which seems dangerous for his spine. Lucas' book tour starts in Omaha where only Mouth is interested or indeed interesing, the real bad news follows. | SCHEDULE RECORD | SCHEDULE RESERVATION |

<SCHEDULED TO BROADCAST EPISODE X>    PLAYBACK START OF EPISODE X-1 (CURRENT TIME) 09:30

| X-2 | X-1 | X |

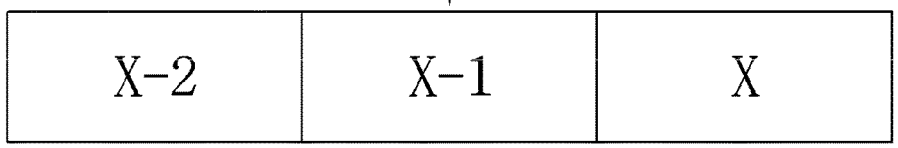

SCHEDULED BROADCAST TIME OF EPISODE X → AUTOMATICALLY RECORD EPISODE X AT BROADCASTING 10:00 TIME OF EPISODE X

FIG. 47

| CONTENT PROVIDER | PRICE | SPEED | NUMBER OF ACCESSES |
|---|---|---|---|
| 1. CP 1 | free | 0.5Mbps | 50 |
| 2. CP 2 | 3$ | 1Mbps | 10 |
| 3. CP 3 | 5$ | 0.1Mbps | 100 |

DISPLAY DEVICE

CROSS REFERENCE TO RELATED APPLICATIONS

This application is the National Phase of PCT International Application No. PCT/KR2016/000923, filed on Jan. 28, 2016, which claims priority under 35 U.S.C. 119(a) to Korean Patent Application No. 10-2015-0018500, filed in the Republic of Korea on Feb. 6, 2015, and to Korean Patent Application No. 10-2015-0021432, filed in the Republic of Korea on Feb. 12, 2015, all of which are hereby expressly incorporated by reference into the present application.

TECHNICAL FIELD

The present invention relates to a display device.

BACKGROUND ART

Recently, digital TV services using a wired or wireless communication network have become common. The digital TV service can provide various services that could not be provided in an existing analog broadcast service.

For example, an Internet Protocol Television (IPTV), which is a type of a digital TV service, provides a bi-directional service that allows a user to actively select a type of a program to be watched, a watching time, and the like. The IPTV service may provide various additional services based on the bi-directionality, for example, Internet browsing, home shopping, online games, and the like.

Additionally, a channel or a broadcast program list registered as favorites by a user has recently been provided for a personalization service of the user.

However, the user has to enter a separate menu screen and confirm registered favorites and has to enter a separate menu screen so as to add a broadcast program being currently watched to favorites.

DISCLOSURE OF THE INVENTION

Technical Problem

The present invention is directed to provide a display device and an operating method thereof, which allow a user to easily add a broadcast program or a broadcast program channel to a favorites list while watching TV.

Additionally, the present invention is directed to provide a display device and an operating method thereof, which provide a unique interface screen so as to allow a user to easily access a list registered as favorites.

The present invention is directed to provide a display device and an operating method thereof, which are capable of providing various watching environments to a user by adding a catch-up function allowing a user to watch previous episodes of a broadcast program on a favorites list or an electronic program guide.

The present invention is directed to provide a display device and an operating method thereof, which are capable of providing various watching environments to a user by providing media content through a virtual channel, in addition to broadcast programs being broadcast or scheduled to be broadcast.

Technical Solution

A display device according to an embodiment of the present invention includes: a display unit configured to display a plurality of icons; an input interface unit configured to receive a request from a remote control device to control the operation of the display device; and a control unit configured to control the display unit and the input interface unit, wherein the control unit configured to play a broadcast program, and if a favorites icon from among the plurality of icons is selected during playback of the broadcast program, display one or more of a favorites channel list and a favorites program list.

Advantageous Effects

According to various embodiments of the present invention, there is an effect that allows a user to easily add a broadcast program or a broadcast program channel to a favorites list while watching TV.

Additionally, a user convenience may be improved by providing a list registered as favorites through a unique interface screen.

According to various embodiments, various watching environments may be provided to a user by adding a catch-up function allowing a user to watch previous episodes of a broadcast program on a favorites list or an electronic program guide.

Additionally, various watching environments may be provided to a user by providing media content through a virtual channel, in addition to broadcast programs being broadcast or scheduled to be broadcast.

BRIEF DESCRIPTION OF THE DRAWINGS

FIG. 8 illustrates an example of a screen which provides a favorites channel list if a favorites channel button is selected, according to an embodiment of the present invention.

FIGS. 15 to 17 illustrate examples of utilizing information displayed on a program icon, according to an embodiment of the present invention.

FIG. 23 is a view for describing an embodiment which deletes an image card on a recent access list, according to an embodiment of the present invention.

FIG. 24 is a view for describing an embodiment which registers an image card as favorites on a recent access list.

FIGS. 34 to 36 are views for describing information provided in a broadcast program region, according to an embodiment of the present invention.

FIG. 38 is a view for describing information provided in a broadcast program region if a catch-up function is not supported in a broadcast program, according to another embodiment of the present invention.

FIG. 39 illustrates an example of detailed information provided if an information icon is selected in a broadcast program region, according to another embodiment of the present invention.

FIGS. 40 to 42 are views for describing various embodiments which may occur if a broadcast program of a previous episode is played back according to an execution of a catch-up function.

FIGS. 43 to 47 are views for describing an embodiment which outputs a content provider list capable of providing media content of a virtual channel, according to various embodiments of the present invention.

MODE FOR CARRYING OUT THE INVENTION

Examples of various embodiments are illustrated in the accompanying drawings and described further below. The suffixes "module" and "unit" for components used in the description below are assigned or mixed in consideration of easiness in writing the specification and do not have distinctive meanings or roles by themselves.

A display device according to an embodiment of the present invention is, for example, an intelligent display device in which a computer support function is added to a broadcast reception function. An Internet function or the like is added to the display device that fundamentally has the broadcast reception function. Accordingly, the display device may include an easy-to-use interface, such as a writing input device, a touch screen, or a spatial remote control device. With the support of a wired or wireless Internet function, the display device can connect to the Internet and computers and perform functions such as e-mail, web browsing, banking, or games. In order to perform such various functions, standardized general-purpose OS can be used.

Accordingly, since various applications are freely added or deleted on a general purpose OS kernel, a display device described herein can perform various user-friendly functions. More specifically, the display device may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
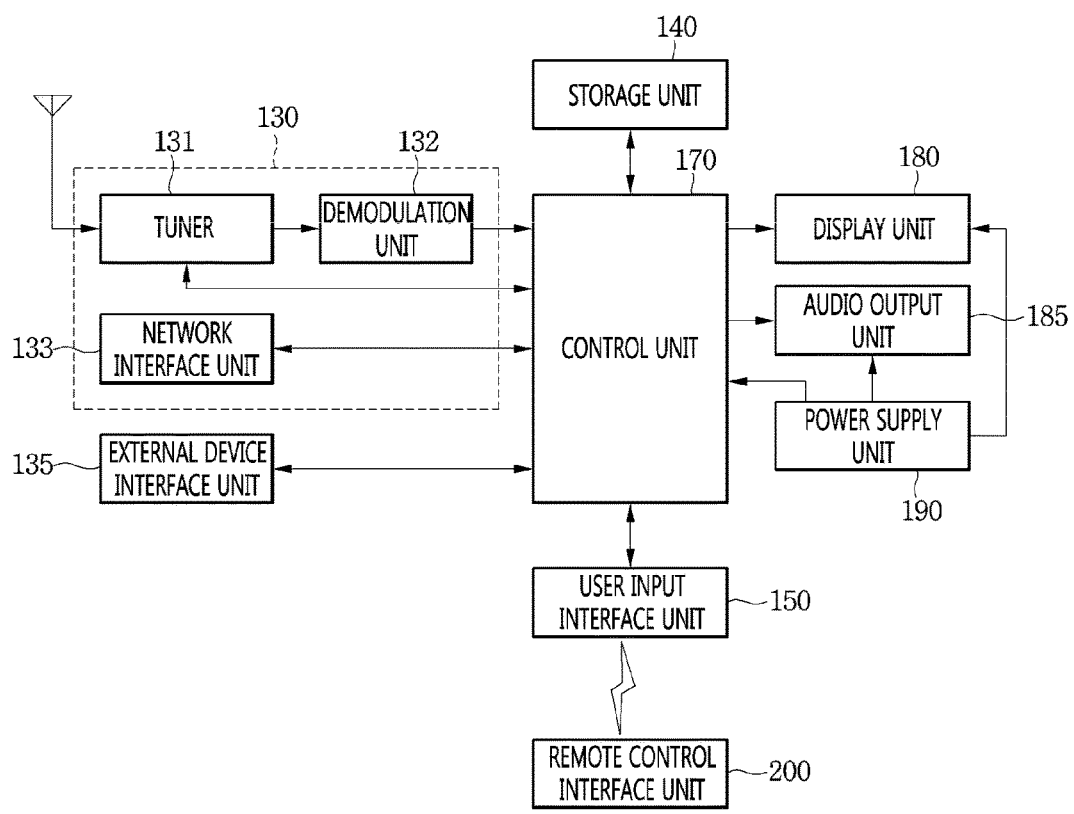
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, the display device 100 may include a broadcast reception unit 130, an external device interface unit 135, a storage unit 140, a user input interface unit 150, a control unit 170, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list of an adjacent external device and transfer the application or the application list to the control unit 170 or the storage unit 140.

The network interface unit 133 may provide an interface for connecting the display device 100 to a wired/wireless network including an Internet network. The network interface unit 133 may transmit or receive data to or from another user or another electronic device through an accessed network or another network linked to the accessed network.

Additionally, the network interface unit 133 may transmit a part of content data stored in the display device 100 to a user or an electronic device selected from other users or other electronic devices preregistered in the display device 100.

The network interface unit 133 may access a predetermined webpage through an accessed network or another network linked to the accessed network. That is, the network interface unit 133 may access the predetermined webpage through the network and transmit or receive data to or from a corresponding server.

The network interface unit 133 may receive content or data provided by a content provider or a network operator. That is, the network interface unit 133 may receive content (e.g., movies, advertisements, games, VOD, broadcast signals, etc.) and content-related information provided from the content provider or the network operator through the network.

Additionally, the network interface unit 133 may receive update information and update files of firmware provided by the network operator and may transmit data to the Internet or content provider or the network operator.

The network interface unit 133 may select and receive a desired application among applications, which are open to the public, through the network.

The storage unit 140 may store a program for signal processing and control in the control unit 170 and may store signal-processed image, voice, or data signals.

Additionally, the storage unit 140 may perform a function for temporarily storing images, voices, or data signals input from the external device interface unit 135 or the network interface unit 133 and may store information on a predetermined image through a channel storage function.

The storage unit 140 may store an application or an application list input from the external device interface unit 135 or the network interface unit 133.

The display device 100 may play back content files (e.g., moving image files, still image files, music files, document files, application files, etc.) stored in the storage unit 140 so as to provide the content files to the user.

The user input interface unit 150 may transfer signals input by the user to the control unit 170 or may transfer signals from the control unit 170 to the user. For example, the user input interface unit 150 may receive and process control signals such as power on/off, channel selection, or screen setup from the remote control device 200 or may transmit control signals from the control unit 170 to the remote control device 200, according to various communication schemes such as Bluetooth, Ultra Wideband (WB), ZigBee scheme, Radio Frequency (RF) communication scheme, or infrared (IR) communication scheme.

Additionally, the user input interface unit 150 may transfer, to the control unit 170, control signals input from local keys (not shown) such as a power key, a channel key, a volume key, and a setting key.

Image signals that are image-processed by the control unit 170 may be input to the display unit 180 and displayed as an image corresponding to the image signals. Additionally, image signals that are image-processed by the control unit 170 may be input to an external output device through the external device interface unit 135.

Voice signals that are processed by the control unit 170 may be output to the audio output unit 185. Additionally, image signals that are processed by the control unit 170 may be input to an external output device through the external device interface unit 135.

In addition, the control unit 170 may control an overall operation of the display device 100.

On the other hand, the control unit 170 may control the display device 100 by a user command input through the user input interface unit 150 or an internal program and may connect to the network to download an application or an application list desired by the user into the display device 100.

The control unit 170 may output channel information selected by the user through the display unit 180 or the audio output unit 185 together with the processed images or voice signals.

Additionally, the control unit 170 may output the image signal or the voice signal, which is input from the external device (e.g., a camera or a camcorder) through the external device interface unit 135, to the display unit 180 or the audio output unit 185 according to an external device image playback command received through the user input interface unit 150.

On the other hand, the control unit 170 may control the display unit 180 to display images. For example, the control unit 170 may control the display unit 180 to display broadcast images input through the tuner 131, external input images input through the external device interface unit 135, images input through the network interface unit, or images stored in the storage unit 140. In this case, an image displayed on the display unit 180 may be a still image or video, and may be a 2D image or a 3D image.

Also, the control unit 170 may perform control to play back content stored in the display device 100, received broadcast content, or external input content input from the outside. The content may be various types, such as a broadcast image, an external input image, an audio file, a still image, a connected web screen, a document file, and the like The display unit 180 may generate a driving signal by converting an image signal, a data signal, or an OSD signal, which is processed by the control unit 170, or an image signal or a data signal, which is received by the external device interface unit 135, into R, G, and B signals.

On the other hand, the display device 100 shown in FIG. 1 is merely one embodiment of the present invention, and some of the illustrated elements may be integrated, added, or omitted according to a specification of the display device 100 to be actually implemented.

That is, if necessary, two or more elements may be integrated into one element, or one element may be divided into two or more elements. Additionally, a function performed by each block is provided for describing the embodiments of the present invention, and a specific operation or device thereof does not limit the scope of the present invention.

According to another embodiment of the present invention, the display device 100 may not include the tuner 131 and the demodulation unit 132, unlike that illustrated in FIG. 1, and may receive an image through the network interface unit 133 or the external device interface unit 135 and play back the received image.

For example, the display device 100 may be divided into an image processing device such as a set-top box for receiving a broadcast signal or content provided by various network services, and a content playback device for playing back content input from the video processing device.

In this case, an operating method of the display device according to an embodiment of the present invention, which will be described below, may be performed by the display device 100 described above with reference to FIG. 1, or may be performed by one of the image processing device such as the set-top box and the content playback device including the display unit 180 and the audio output unit 185.

Next, the remote control device according to an embodiment of the present invention will be described with reference to FIGS. 2 and 3.

Figure 2:
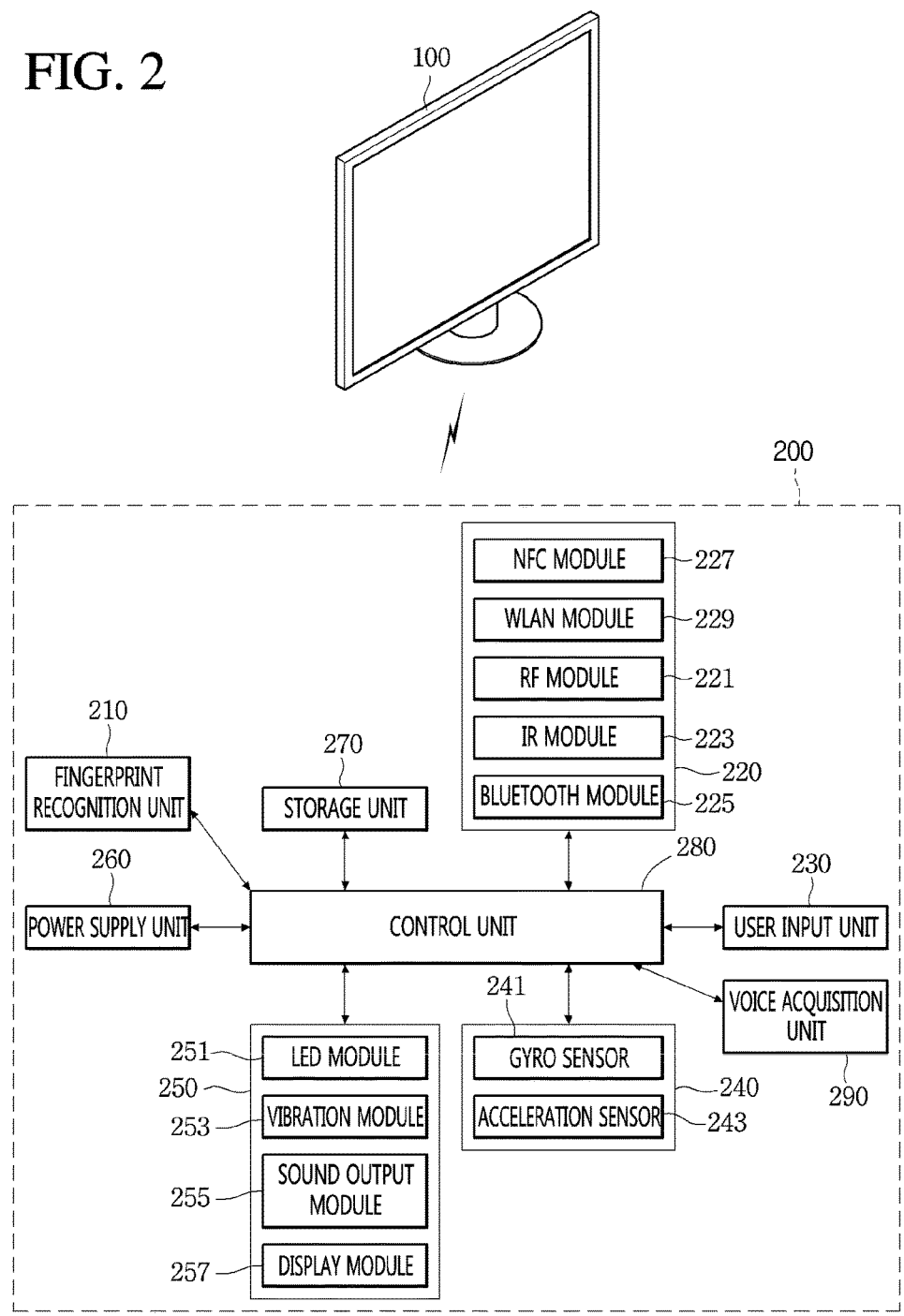
FIG. 2 is a block diagram illustrating a remote control device according to an embodiment of the present invention.
Figure 3:
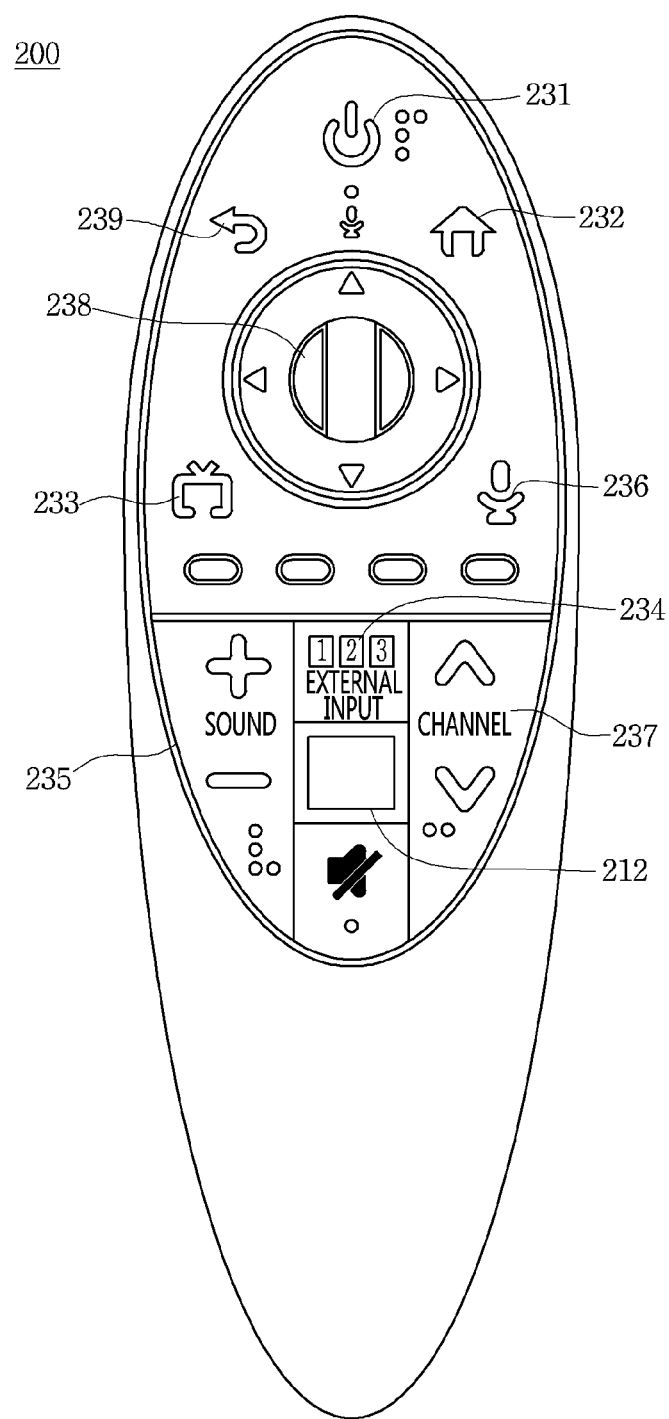
FIG. 3 illustrates an actual configuration example of the remote control device according to an embodiment of the present invention.

FIG. 2 is a block diagram of the remote control device according to an embodiment of the present invention, and FIG. 3 illustrates an actual configuration example of the remote control device 200 according to an embodiment of the present invention.

First, referring to FIG. 2, the remote control device 200 may include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits a signal to and receives a signal from any one of the display devices according to the aforementioned embodiments of the present invention.

The remote control device 200 may include an RF module 221 configured to transmit a signal to and receive a signal from the display device 100 according to an RF communication standard, and an IR module 223 configured to transmit a signal to and receive a signal from the display device 100 according to an IR communication standard. Also, the remote control device 200 may include a Bluetooth module 225 configured to transmit a signal to and receive a signal from the display device 100 according to a Bluetooth communication standard. Additionally, the remote control device 200 may include a Near Field Communication (NFC) module 227 configured to transmit and receive a signal to and from the display device 100 according to an NFC communication standard, and a Wireless LAN (WLAN) module 229 configured to transmit and receive a signal to and from the display device 100 according to a WLAN communication standard.

Additionally, the remote control device 200 may transmit signals containing information on a movement of the remote control device 200 to the display device 100 through the wireless communication unit 220.

On the other hand, the remote control device 200 may receive a signal transmitted by the display device 100 through the RF module 221 and, if necessary, may transmit a command for power on/off, channel change, volume change, or the like to the display device 100 through the IR module 223.

The user input unit 230 may include a keypad, a button, a touch pad, or a touch screen. The user may manipulate the user input unit 230 to input a command associated with the display device 100 to the remote control device 200. If the user input unit 230 includes a hard key button, the user may push the hard key button to input a command associated with the display device 100 to the remote control device 200. Details thereof will be described below with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a check button 238, and a back button 239.

The fingerprint recognition button 212 may be a button for recognizing a user's fingerprint. According to an embodiment, the fingerprint recognition button 212 may perform a push operation and receive a push operation and a fingerprint recognition operation. The power button 231 may be a button for turning on or off the power of the display device 100. The home button 232 may be a button for moving to the home screen of the display device 100. The live button 233 may be a button for displaying a broadcast program in real time. The external input button 234 may be a button for receiving an external input connected to the display device 100. The volume control button 235 may be a button for adjusting a volume output from the display device 100. The voice recognition button 236 may be a button for receiving a user's voice and recognizing the received voice. The channel change button 237 may be a button for receiving a broadcast signal of a specific broadcast channel. The check button 238 may be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 may include various types of input means manipulated by a user, for example, a scroll key or a jog key, and this embodiment does not limit the scope of the present invention.

The sensor unit 240 may include a gyro sensor 241 or an acceleration sensor 243, and the gyro sensor 241 may sense information on a movement of the remote control device 200.

For example, the gyro sensor 241 may sense information on an operation of the remote control device 200 on the basis of x, y, and z axes, and the acceleration sensor 243 may sense information on a movement speed of the remote control device 200. Moreover, the remote control device 200 may further include a distance measurement sensor and sense a distance with respect to the display unit 180 of the display device 100.

The output unit 250 may output image or voice signals in response to manipulation of the user input unit 235 or image or voice signals corresponding to signals transmitted from the display device 100. A user can recognize whether the user input unit 235 is manipulated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and, if the remote control device 200 does not move for a predetermined time, stops supplying power, so that power waste can be reduced. The power supply unit 260 may resume the power supply if a predetermined key provided at the remote control device 200 is manipulated.

The storage unit 270 may store various types of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals wirelessly to/from the display device 100 paired with the remote control device 200 and refer to the information.

The control unit 280 controls general matters relating to control of the remote control device 200. The control unit 280 may transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 may obtain voice.

The voice acquisition unit 290 may include at least one microphone 291 and acquire voice through the microphone 291.

Figure 4:
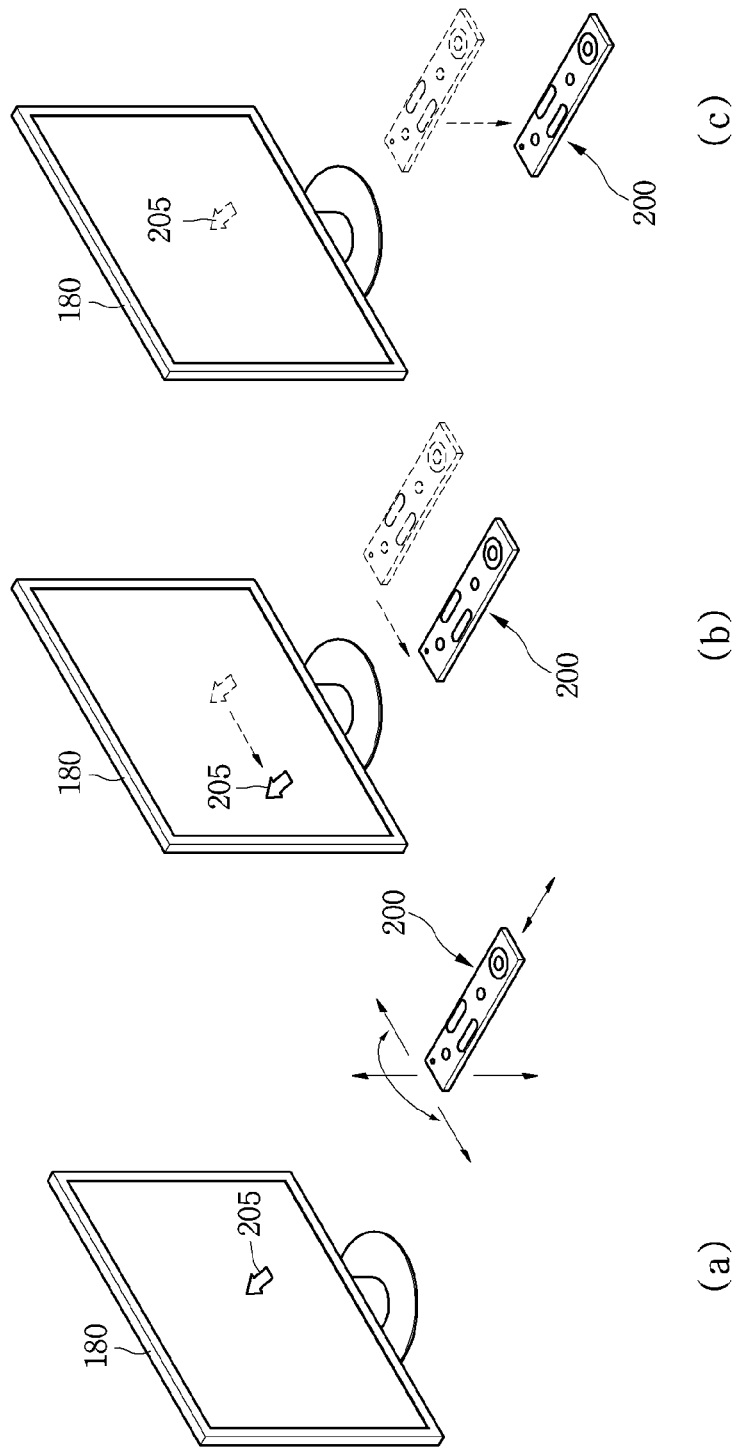
FIG. 4 illustrates an example of utilizing the remote control device according to an embodiment of the present invention.

Next, FIG. 4 is described.

FIG. 4 illustrates an example of utilizing the remote control device according to an embodiment of the present invention.

FIG. 4(a) illustrates an example in which a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may also be referred to as a spatial remote control device.

FIG. 4(b) illustrates an example in which if a user moves the remote control device 200 to the left, the pointer 205 displayed on the display unit 180 of the display device 100 is also moved to the left according to the movement of the remote control device 200.

Information on the movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates an example in which while a specific button in the remote control device 200 is pressed, a user moves the remote control device 200 away from the display unit 180. Due to this, a selection area in the display unit 180 corresponding to the pointer 205 may be zoomed in and displayed larger.

On the contrary, if a user moves the remote control device 200 in a direction closer to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

On the other hand, the pointer in this specification means an object displayed on the display unit 180 in response to the operation of the remote control device 200. Accordingly, besides an arrow form displayed as the pointer 205 in the drawing, various forms of objects are possible. For example, the above concept includes a point, a cursor, a prompt, and a thick outline. The pointer 205 may be displayed in correspondence to one point of a horizontal axis and a vertical axis on the display unit 180 and also can be displayed in correspondence to a plurality of points such as a line and a surface.

Next, the operating method of the display device 100, according to an embodiment of the present invention, will be described with reference to FIG. 5.

Figure 5:
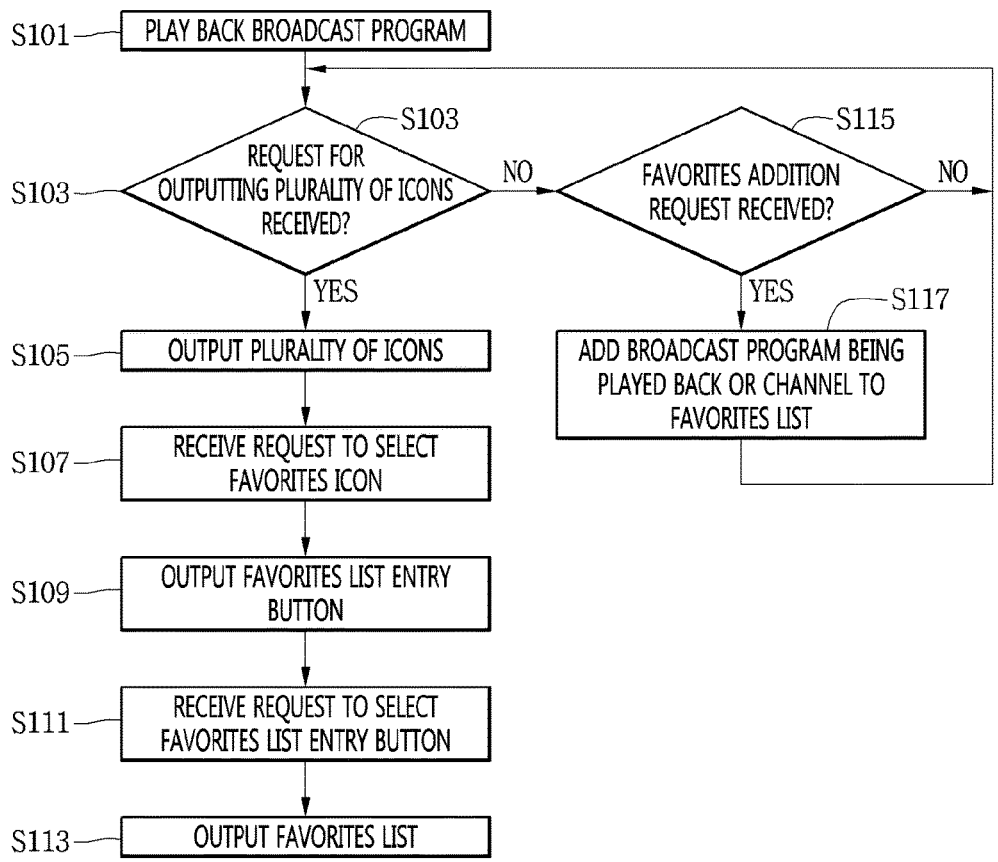
FIG. 5 is a flowchart of an operating method of the display device, according to an embodiment of the present invention.

FIG. 5 is a flowchart of an operating method of the display device, according to an embodiment of the present invention.

The control unit 170 of the display device 100 plays back a broadcast program (S101). The control unit 170 may output the broadcast program through the display unit 180.

The control unit 170 of the display device 100 checks whether a request for outputting a plurality of icons during the playback of the broadcast program is received (S103), and outputs the plurality of icons according to the received request if the request for outputting the plurality of icons is received (S105).

The plurality of icons according to an embodiment may include an icon including information on a recently watched broadcast program, an icon indicating a content provider providing media content, an icon indicating an external device connected to the display device 100 or an external input, and a favorites icon providing a favorites list.

In an embodiment, the request for outputting the plurality of icons may be received from the remote control device 200. That is, if a command of selecting the home button 232 provided in the remote control device 200 is requested, the remote control device 200 may transmit a request to select the home button 232 to the display device 100. The display device 100 may output the plurality of icons according to the request received from the remote control device 200.

Operations S103 to S105 will be described in detail below.

Figure 6:
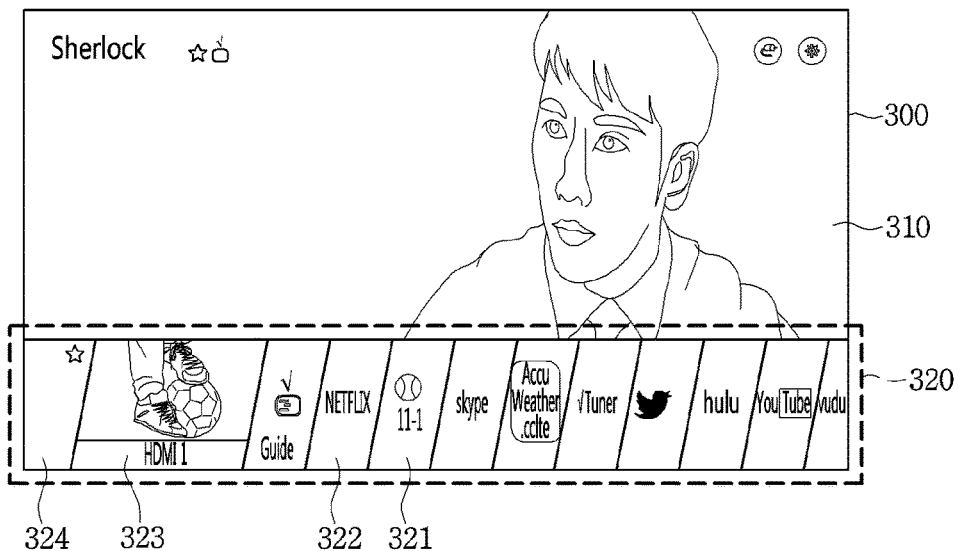
FIG. 6 illustrates an example of a screen displaying a plurality of icons during playback of a broadcast program, according to an embodiment of the present invention.

FIG. 6 illustrates an example of a screen displaying a plurality of icons during playback of a broadcast program, according to an embodiment of the present invention.

In FIG. 6, a screen 300 displayed through the display unit 180 may be referred to as a main screen. The main screen may be a screen initially displayed after a booting of the display device 100 is completed. The plurality of icons included in a service display region 320 displayed on the main screen may be displayed according to the command received from the remote control device 200.

The control unit 170 may output the plurality of icons according to the request to output the plurality of icons during the playback of the broadcast program. The request to output the plurality of icons may be an output command received from the remote control device 200 according to an input of selecting the home button 232 of the remote control device 200.

Referring to FIG. 6, the screen 300 of the display device 100 may include a broadcast program display region 310 which is a region where the broadcast program is played back, and a service display region 320 which is a region where the plurality of icons are displayed. The broadcast program display region 310 may be an entire region of the screen 300, and the service display region 320 may be a partial region of the screen 300. The service display region 320 may be displayed to overlap the broadcast program display region 310.

The service display region 320 may include a recent playback icon 321 including information on latest played-back media content, a content provider icon 322 indicating a content provider providing media content via a network, an external input icon 323 indicating an external input port, and a favorites icon 324 for providing a favorites list.

The recent playback icon 21 may include information on the media content most recently played back in the display device 100. For example, if the media content is a broadcast program, one or more of a thumbnail image of the broadcast program, a title of the broadcast program, a channel number of the broadcast program, and a name of a broadcasting company providing the broadcast program may be displayed on the recent playback icon 321. In an embodiment, the recent playback icon 321 may be displayed if the broadcast program is played back through the display device 180 for more than a predetermined time.

A name of the content provider and an image identifying the content provider may be displayed on the content provider icon 322. The content provider icon 322 may be an icon corresponding to an application which provides an access to the content provider providing the media content.

A name (for example, HDMI 1) of a most recently connected external input or a thumbnail image of media content played back through the most recently connected external input may be displayed on the external input icon 323.

An identifier indicating favorites may be displayed on the favorites icon 324. The favorites icon 324 may or may not be included in the service display region 320 according to setting. If the favorites icon 324 is not included in the service display region 320, the control unit 170 may receive an input of a specific key button provided in the remote control device 300 and display the favorites icon 324 in the service display region 320.

In an embodiment, the plurality of icons arranged in the service display region 320 may be icons set by a manufacturer of the display device 100.

In another embodiment, the plurality of icons displayed in the service display region 320 may be differently arranged according to a setting input of a user. The user may change the arrangement of the plurality of icons included in the service display region 320.

Again, FIG. 5 is described.

The control unit 170 of the display device 100 receives a request to select the favorites icon from among the plurality of icons (S107), and outputs a favorites list entry button for entering the favorites list according to the received request (S109).

Operations S107 and S109 will be described with reference to FIG. 7.

Figure 7:
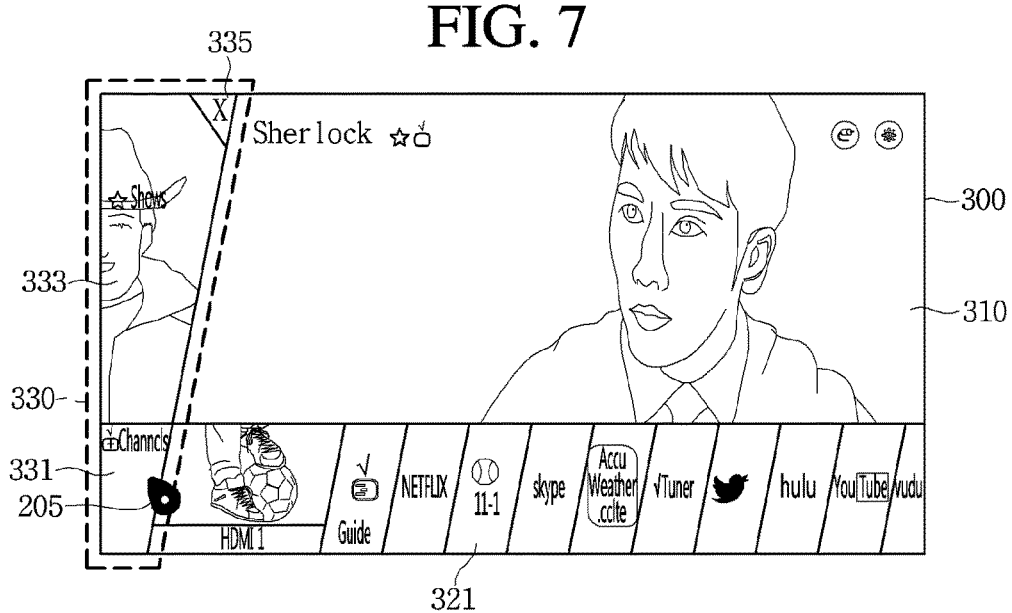
FIG. 7 illustrates an example of a screen which outputs a favorites list entry button if a favorites icon is selected, according to an embodiment of the present invention.

FIG. 7 illustrates an example of a screen in which a favorites list entry button is output if a favorites icon is selected, according to an embodiment of the present invention.

In FIG. 6, if the favorites icon 324 is selected, the control unit 170 may display the favorites list entry button 330 at a position where the favorites icon 324 has been displayed, without displaying the favorites icon 324 through the display unit 180. The favorites list entry button 330 may include a favorites channel button 331 for providing the bookmarked channel list, a favorites program button 333 for providing a bookmarked broadcast program list, and a close button 335 for closing the favorites list entry button 330.

A thumbnail image corresponding to a specific broadcast program among the bookmarked broadcast programs may be displayed on the favorites program button 333. The specific broadcast program may be a most recently bookmarked broadcast program, but is merely an example.

If the close button 335 is selected, the control unit 170 may control the display unit 180 to display the favorites icon 324, as shown in FIG. 6, without displaying the favorites list entry button 330.

Again, FIG. 5 is described.

The control unit 170 of the display device 100 receives a request to select the output favorites list entry button (S111), and outputs a favorites list according to the received request (S113).

In an embodiment, the request to select the favorites list entry button 330 may be a request to select one of the favorites channel button 331 and the favorites program button 333.

In another embodiment, the remote control device 200 may further include a favorites list button (not shown), and if the favorites list button (not shown) is selected, the display device 100 may directly output the favorites list according to a command received from the remote control device 200.

Operation S113 will be described below in detail.

FIG. 8 illustrates an example of a screen which provides a favorites channel list if a favorites channel button is selected, according to an embodiment of the present invention.

Referring to FIG. 8, the control unit 170 may output the favorites channel list 340 according to a request to select the favorites channel button 331. The control unit 170 may receive the request to select the favorites channel button 331 through the pointer 205 moving according to the movement of the remote control device 200.

The favorites channel list 340 may be displayed on the broadcast program display region 310. The favorites channel list 340 may include at least one channel icon including information on the bookmarked channels and a channel addition icon for adding a channel as favorites. The channel addition icon will be described below. A scroll button (not shown) may be displayed on the screen 300, and the user may view more favorites channels through the scroll button. The user may easily confirm the information on the channels registered by the user as favorites through the favorites channel list 340.

In an embodiment, a catch-up icon (not shown) may be further displayed on one side of each channel icon or within each channel icon. The catch-up icon may be an icon for providing information on a broadcast program corresponding to a previous episode of a broadcast program provided on a corresponding channel. Embodiments described below with reference to FIGS. 32 to 42 will be applied to the catch-up icon.

Information on the corresponding channel may be displayed on each channel icon. This will be described below with reference to FIG. 9.

Figure 9:
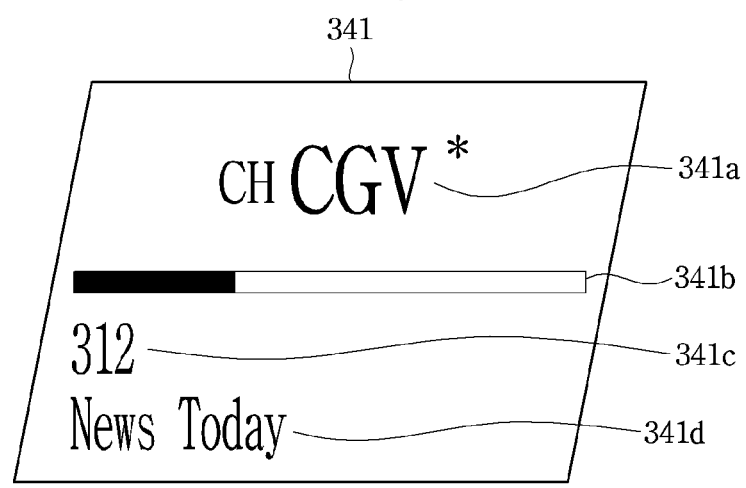
FIG. 9 is a view for describing information included in each channel icon according to an embodiment of the present invention.

FIG. 9 is a view for describing information included in each channel icon according to an embodiment of the present invention.

Referring to FIG. 9, the channel icon 341 included in the favorites channel list 340 may include a channel logo 341a for identifying the channel, a progress bar 341b indicating a progress state of a program being broadcast on a corresponding channel, a channel number 341c, and a program title 341d being broadcast on the corresponding channel. The channel logo 341a may include a name of a broadcasting company providing the channel.

In an embodiment, if the channel icon 341 is selected, the control unit 170 may change a current channel to a channel corresponding to the selected channel icon 341. This will be described below with reference to FIG. 10.

Figure 10:
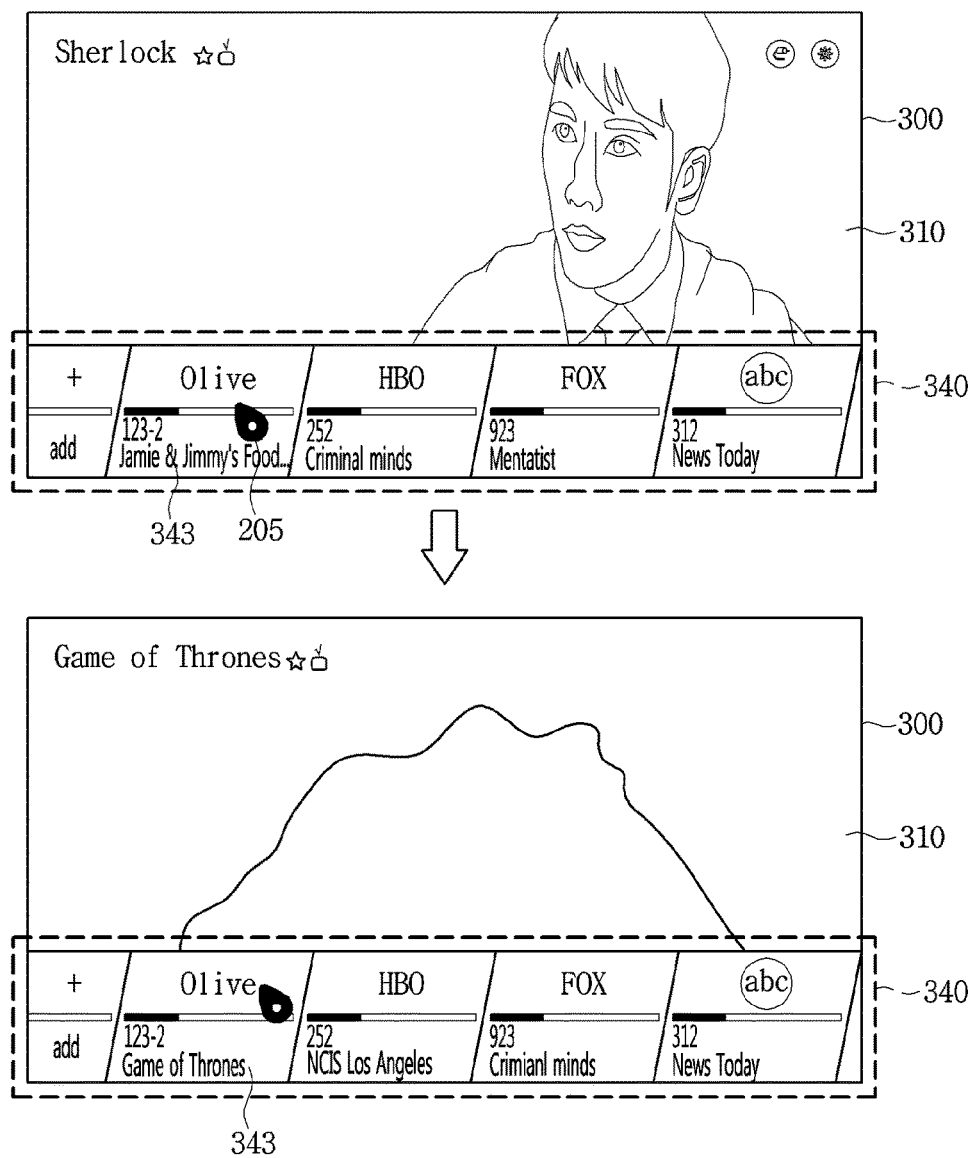
FIG. 10 is a view for describing an embodiment which can be changed to a corresponding channel if a channel icon is selected, according to an embodiment of the present invention.

FIG. 10 is a view for describing an embodiment which can be changed to a corresponding channel if a channel icon is selected, according to an embodiment of the present invention.

Referring to FIG. 10, the control unit 170 may change the current channel to the channel corresponding to the selected channel icon 341 according to the request to select the channel icon 341 included in the favorites channel list 340. Accordingly, a broadcast program provided on the changed channel may be displayed in the broadcast program display region 310.

The user can easily change the channels through real-time broadcast information on the channels previously registered as favorites.

Figure 11:
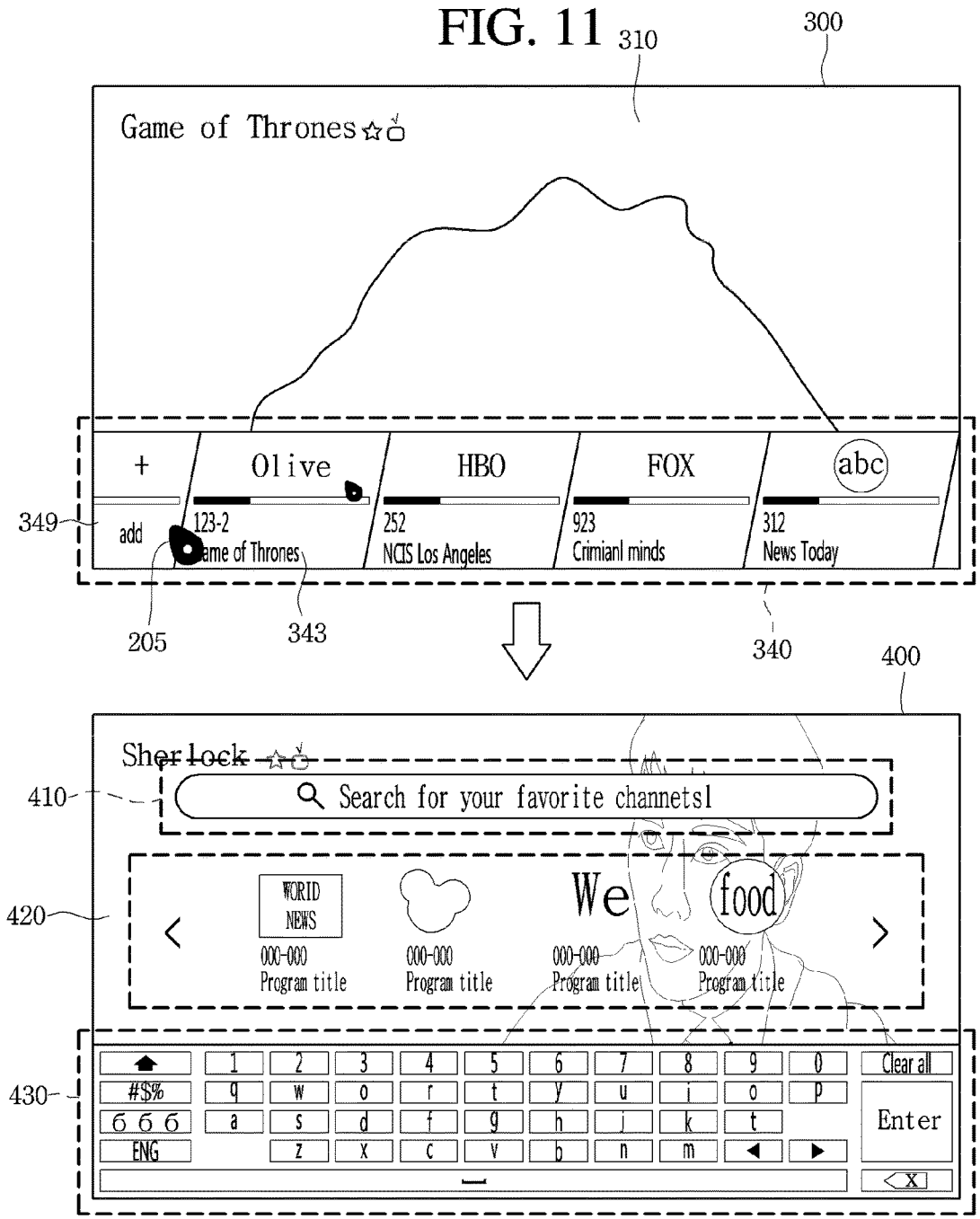
FIGS. 11 and 12 are screens illustrating an example of searching for a channel to be added to a favorites channel list if a channel addition icon is selected, according to an embodiment of the present invention.
Figure 12:
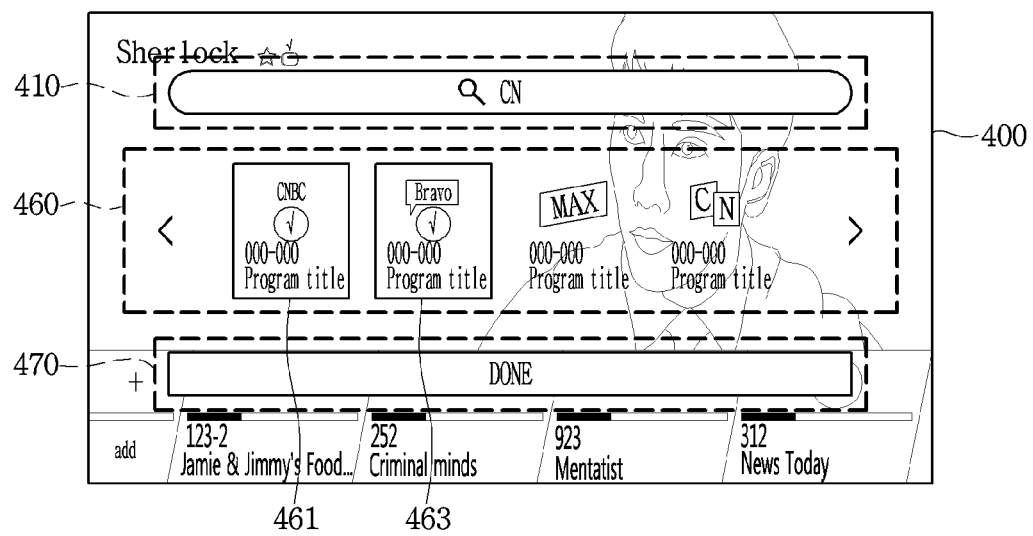

Next, FIGS. 11 and 12 are described.

FIGS. 11 and 12 are screens illustrating an example of searching for a channel to be added to a favorites channel list if a channel addition icon is selected, according to an embodiment of the present invention.

Referring to FIG. 11, the favorites channel list 340 may further include a channel addition icon 349. If the channel addition icon 349 is selected, the control unit 170 may control the display unit 180 to display a channel search screen 400 for searching for a channel to be added to the favorites channel list 340.

The channel search screen 400 may include a channel search tab 410, a recommended channel list 420, and a keypad 430. The channel search tab 410 may be a tab for displaying a channel search word input through the keypad 430. The recommended channel list 420 may be a list of channels recommended to the user. The keypad 430 may include buttons for inputting a search word so as to display a search word on the channel search tab 410. If one or more of the channels included on the recommended channel list 420 are selected, the control unit 170 may add the selected channels to the favorites channel list 340.

If a search word <CN> is input to the channel search tab 410 and a channel search request is received, the control unit 170 may control the display unit 180 to display a channel search result list 460 based on the search word <CN> on the screen 400.

If two channels 461 and 463 are selected from the channels included in the channel search result list 460 and a favorites register button 470 is selected, the control unit 170 may add the selected two channels 461 and 463 to the favorites channel list 340.

Figure 13:
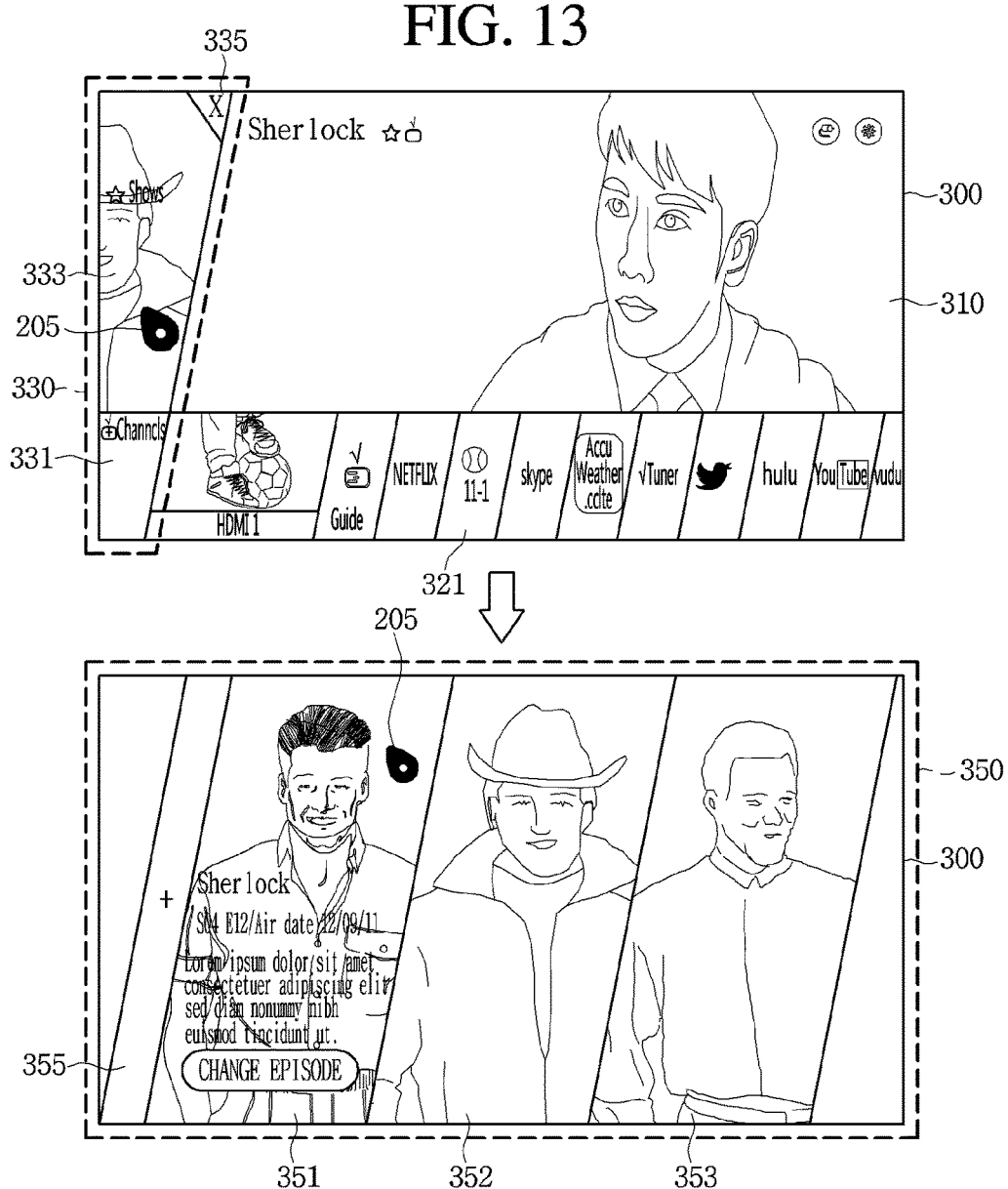
FIG. 13 illustrates an example of a screen which provides a favorites program list if a favorites program button is selected, according to an embodiment of the present invention.

Next, FIG. 13 is described.

FIG. 13 illustrates an example of a screen which provides a favorites program list if a favorites program button is selected, according to an embodiment of the present invention.

Referring to FIG. 13, the control unit 170 may output the favorites program list 350 on the entire region of the screen 300 according to a request to select the favorites program button 333. The control unit 170 may receive the request to select the favorites program button 333 through the pointer 205 moving according to the movement of the remote control device 200.

The favorites program list 350 may include information on programs registered as favorites. The favorites program list 350 may include a plurality of program icons 351, 352, and 353 corresponding to the programs registered as favorites and a program addition icon 355. The plurality of program icons 351, 352, and 353 may correspond to a plurality of broadcast programs registered as favorites, respectively. The plurality of program icons 351, 352, and 353 may include thumbnail images of the programs, respectively. The program addition icon 353 may be an icon for adding the broadcast program to the favorites program list 350. A scroll button (not shown) may be displayed on the screen 300, and the user may view more programs registered as favorites through the scroll button.

The display device 100 may display the favorites program list 350 in an entire region of the screen 300 and shows a thumbnail image as a background, thereby providing a sense of immersion and convenience to the user.

The user may easily confirm the information on the programs registered by the user as favorites through the favorites program list 350.

In an embodiment, a catch-up icon (not shown) may be further displayed on one side of each program icon or within each program icon. The catch-up icon may be an icon for providing information on a broadcast program corresponding to a previous episode of a broadcast program registered as favorites. Embodiments described below with reference to FIGS. 32 to 42 will be applied to the catch-up icon.

Information on the corresponding program may be displayed on each program icon. This will be described below with reference to FIG. 14.

Figure 14:
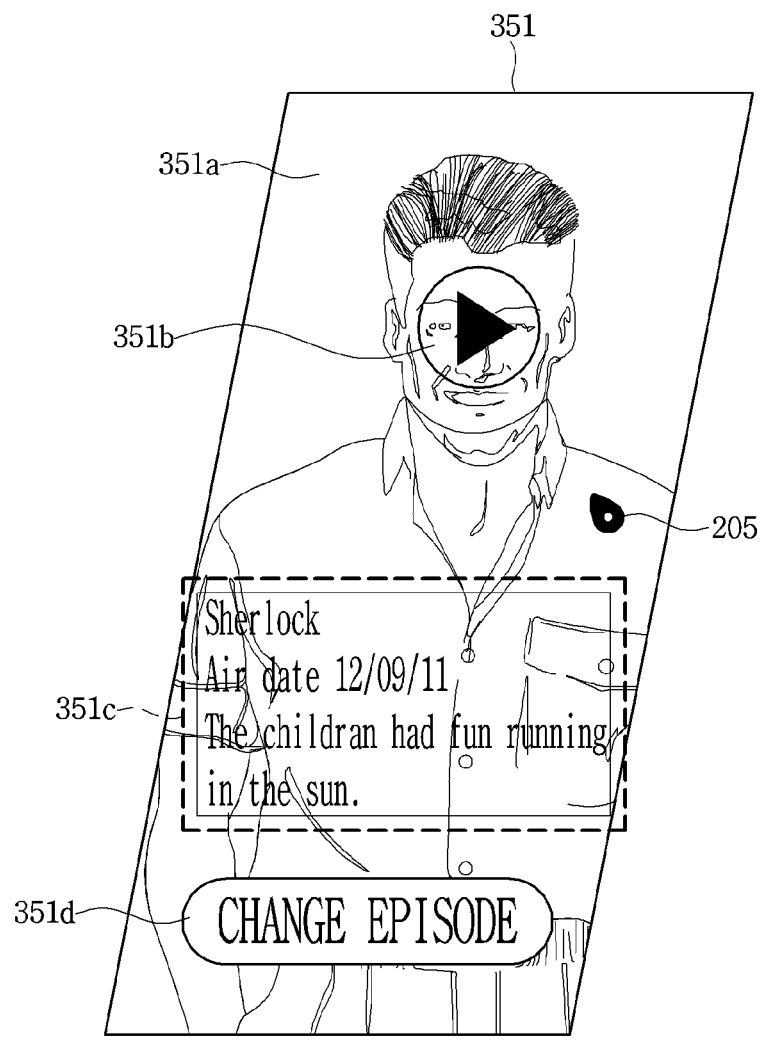
FIG. 14 is a view for describing information included in each program icon according to an embodiment of the present invention.

FIG. 14 is a view for describing information included in each program icon according to an embodiment of the present invention.

In an embodiment, if the pointer 205 is located on the program icon 351, the corresponding program icon 351 is highlighted and the information on the broadcast program corresponding to the corresponding program icon 351 may be output on the program icon 351.

Referring to FIG. 14, the information output on the program icon 351 may include a thumbnail image 351a, a playback button 351b, episode information 351c, and an episode change button 351d.

The thumbnail image 351a may be a thumbnail image corresponding to the corresponding broadcast program. In an embodiment, the thumbnail image may include a major character appearing in the corresponding broadcast program. The control unit 170 may recognize a face of the major character included in the thumbnail image, and may control the arrangement of the thumbnail so that the face of the major character is located at the center of the program icon 351 based on the recognition result.

The playback button 351b may be a button for providing episodes of the corresponding broadcast program. If the playback button 351b is selected, the control unit 170 may display a content provider list capable of providing episodes of the corresponding broadcast program. This will be described below.

The episode information 351c may include a title of the broadcast program, a broadcasting time of the broadcast program, and a synopsis.

The episode change button 351d may be a button for providing information on broadcast programs of other episodes.

Next, an embodiment which utilizes information on the program icon will be described with reference to FIGS. 15 to 17.

Figure 15:
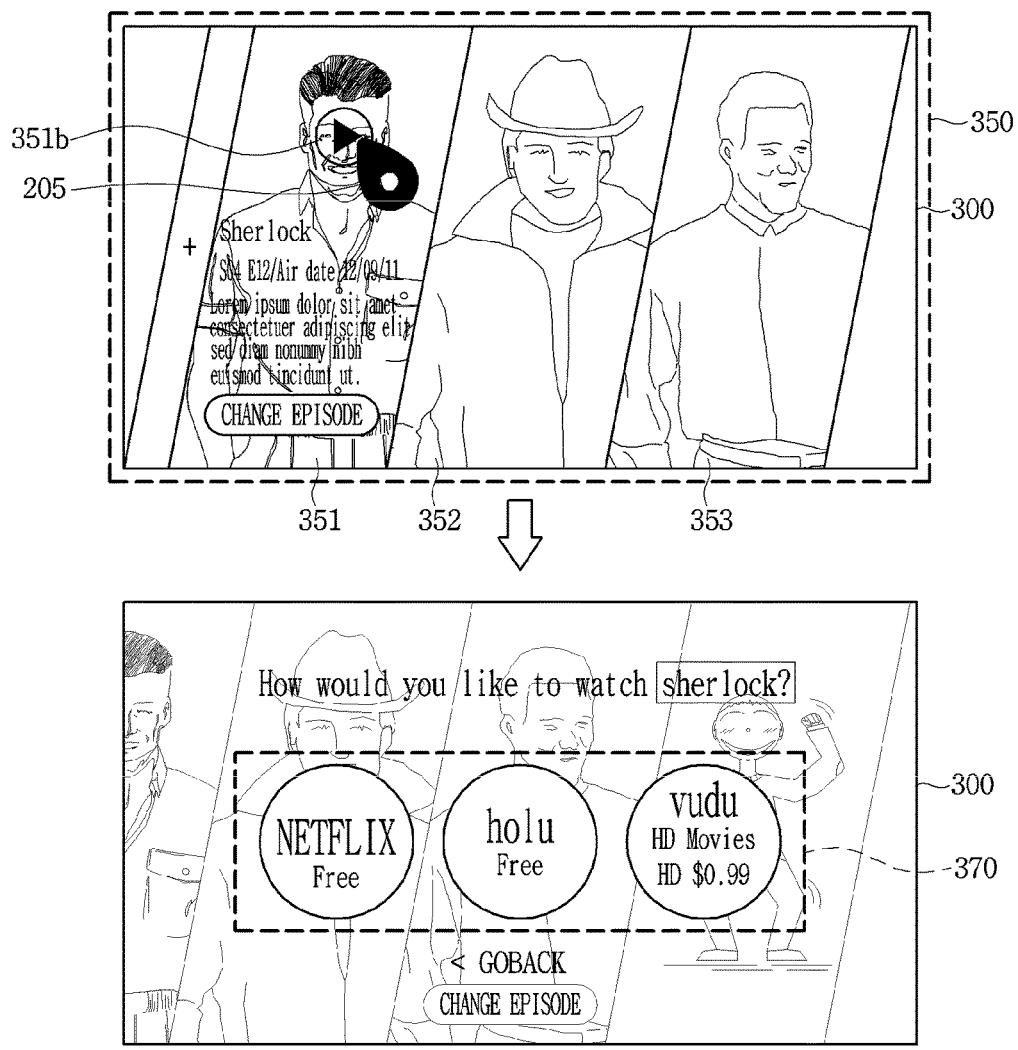
Figure 16:
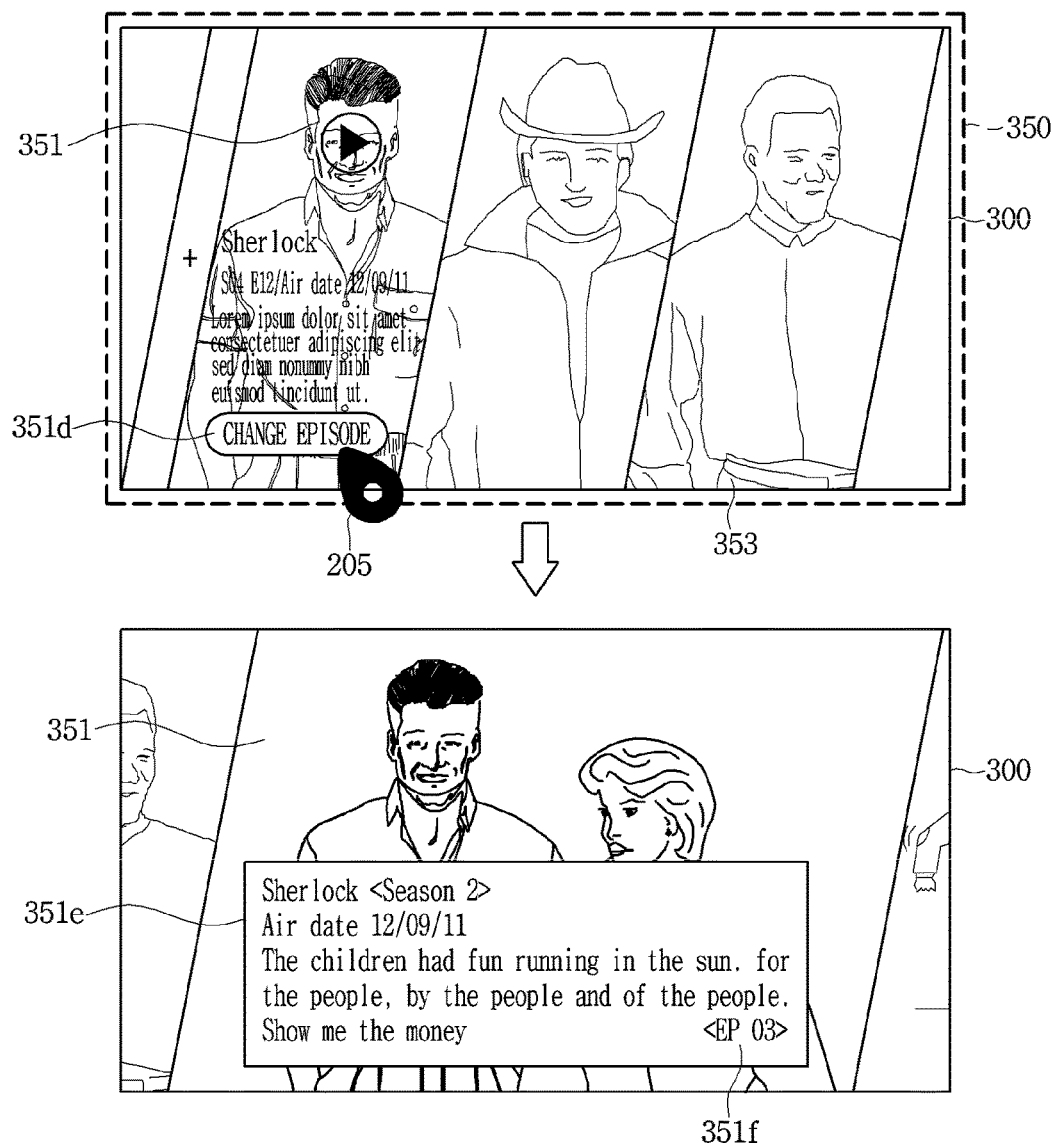

FIGS. 15 to 17 illustrate examples of utilizing information displayed on the program icon, according to an embodiment of the present invention.

First, referring to FIG. 15, the control unit 170 may control the display unit 180 to display a content provider recommendation list 370 capable of providing the corresponding program according to the reception of the request to select the playback button 351*b* on the program icon 351 included in the favorites program list 350. The content provider recommendation list 370 may include information on names of a plurality of content providers and costs involved in providing the corresponding broadcast program by each content provider.

In an embodiment, the display device 100 may display, on the content provider recommendation list 370, only content providers capable of providing the broadcast programs at the lowest price among the plurality of content providers capable of providing the corresponding programs.

In another embodiment, the display device 100 may display, on the content provider recommendation list 370, only content providers capable of providing the broadcast programs at the highest speed among the plurality of content providers capable of providing the corresponding programs.

In further another embodiment, if the corresponding broadcast program is stored in the storage unit 140 of the display device 100, the corresponding broadcast program stored in the storage unit 140 may be directly played back, without displaying the content provider list 370.

In still further another embodiment, if the corresponding broadcast program is stored in a peripheral device connected to the display device 100, the corresponding broadcast program stored in the peripheral device may be directly played back, without displaying the content provider list 370.

Next, FIG. 16 is described.

Referring to FIG. 16, the control unit 170 may enlarge the size of the program icon 351 according to the reception of the request to select the episode change button 351*d* on the program icon 351 included in the favorites program list 350. The control unit 170 may display detailed information 351*e* of the corresponding broadcast program and an episode change tab 351*f* for episode change on the program icon 351, while enlarging the size of the program icon 351.

According to another embodiment of the present invention, the episode change tab 351*f* may be substituted with the catch-up icon described below.

The user may easily obtain information on the corresponding program and information on programs of other episodes.

Next, FIG. 17 is described.

FIG. 17 is a screen showing an example of searching for a program to be added to a favorites program list if a program addition icon is selected, according to an embodiment of the present invention.

Referring to FIG. 17, the favorites program list 350 may further include a program addition icon 355. The program addition icon 355 may be located at the front or rear on the favorites program list 350. If the channel addition icon 355 is selected through the pointer 205, the control unit 170 may control the display unit 180 to display a program search screen 500 for searching for a program to be added to the favorites program list 350.

The program search screen 500 may include a program search tab 410, a recommended program list 420, and a keypad (not shown). The program search tab 410 may be a tab for displaying a program search word input through the keypad provided in the remote control device 200 or the keypad (not shown) displayed on the program search screen 500. The recommended program list 420 may be a list of programs recommended to the user. If one or more of the programs included on the recommended list 420 are selected, the control unit 170 may add the selected one or more programs to the favorites program list 350. The keypad (not shown) may be identical to the keypad 430 shown in FIG. 11.

Figure 18:
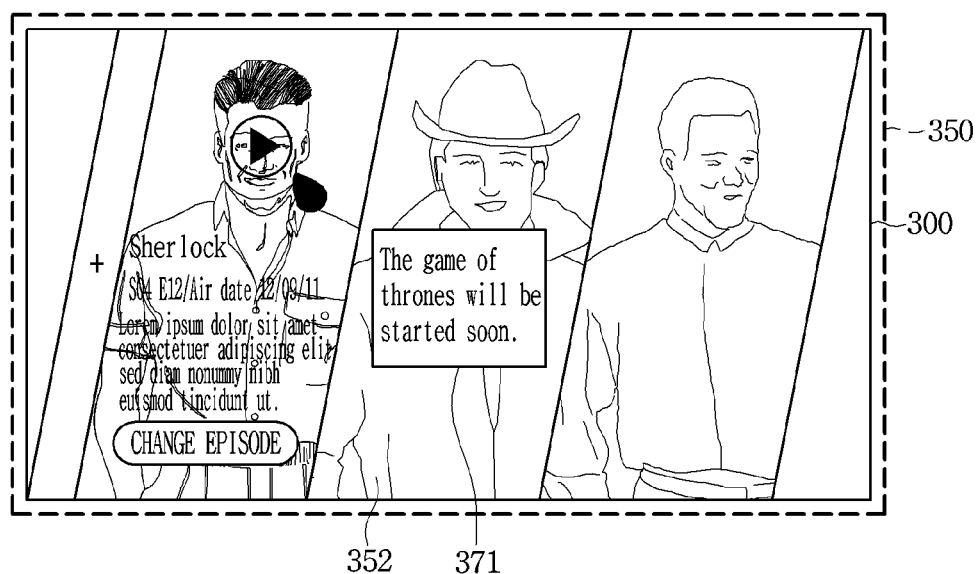
FIG. 18 is a view for describing an embodiment that notifies a user that a program is scheduled to be broadcast or a program is being broadcast on a program icon of a favorites program list, according to an embodiment of the present invention.

Next, FIG. 18 is described.

FIG. 18 is a view for describing an embodiment that notifies a user that a program is scheduled to be broadcast or a program is being broadcast on a program icon of a favorites program list, according to an embodiment of the present invention.

Referring to FIG. 18, if the program corresponding to the program icon 352 included in the favorites program list 350 is to be broadcast or is being broadcast, the control unit 170 may control the display unit 180 to display a message window 371 on the program icon 352 so as to notify that the program is scheduled to be broadcast or is being broadcast. If the message window 371 is selected, the control unit 170 may tune a channel to a channel of a program scheduled to be broadcast or a program being broadcast and play back the program provided in the tuned channel.

The user may check the program scheduled to be broadcast or being broadcast through the favorites program list and easily watch the corresponding program.

Again, FIG. 5 is described.

On the other hand, the control unit 170 of the display device 100 checks whether a favorites addition request during the playback of the broadcast program is received (S115), and, if the favorites addition request is received, adds the broadcast program being played back or the channel of the broadcast program according to the received request (S117).

In an embodiment, the favorites addition request may be a request for adding the channel of the broadcast program being currently played back to the favorites channel list.

In another embodiment, the favorites addition request may be a request for adding the broadcast program being currently played back to the favorites program list. Operations S115 to S117 will be described with reference to FIGS. 19 and 20.

Figure 19:
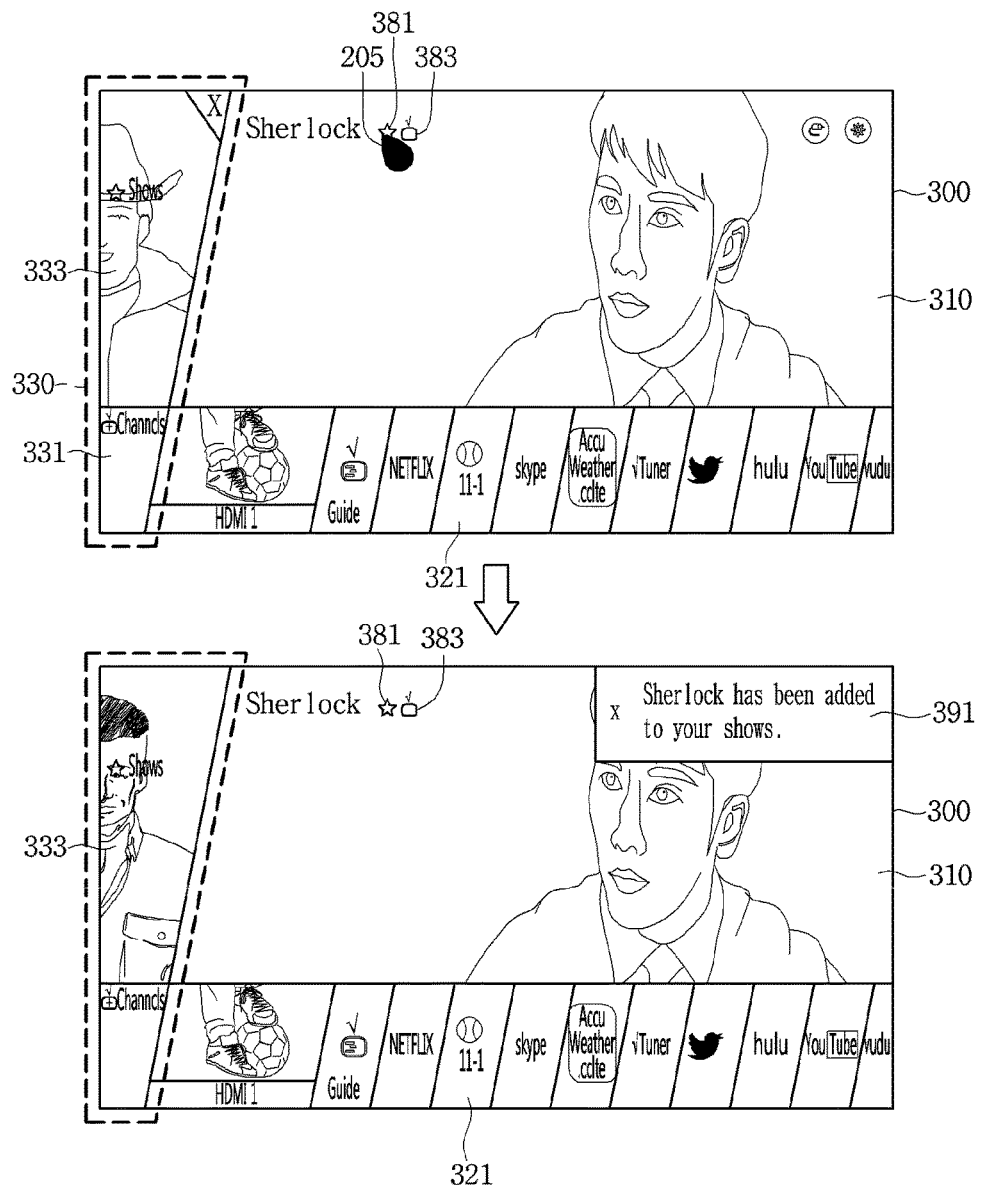
FIGS. 19 and 20 are views for describing an embodiment that adds a broadcast program being played back or a channel of the broadcast program to a favorites list according to a reception of a favorites addition request.
Figure 20:
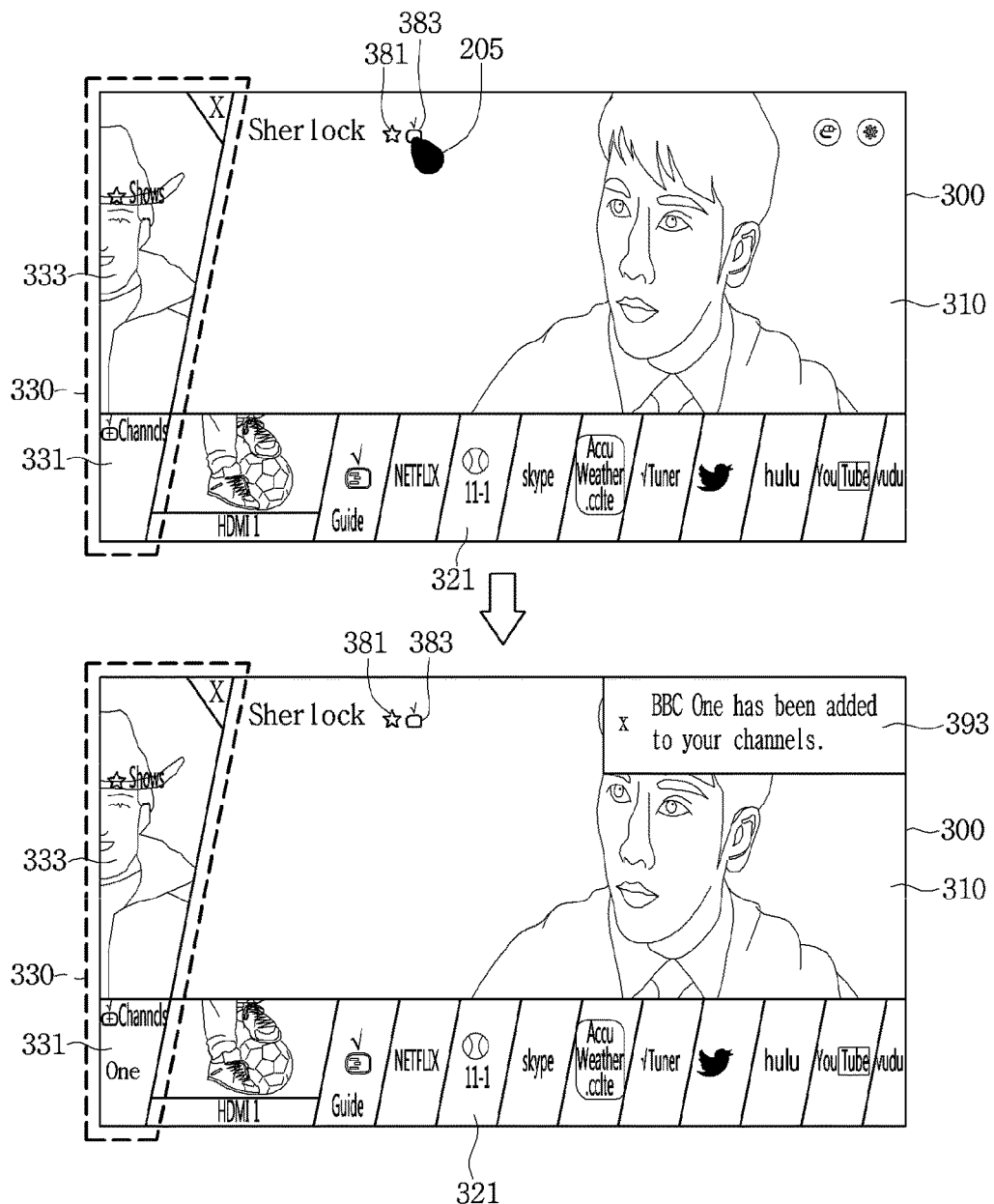

FIGS. 19 and 20 are views for describing an embodiment that adds a broadcast program being played back or a channel of the broadcast program to a favorites list according to a reception of a favorites addition request.

First, referring to FIG. 19, a program addition item 381 and a channel addition item 383 may be displayed in the broadcast program display region 320 on the screen 300 of the display device 100. The program addition item 381 and the channel addition item 383 may be displayed adjacent to the title of the broadcast program being currently played back and the title of the channel. If the program addition item 381 is selected, the control unit 170 may add the broadcast program being currently played back to the favorites program list. If the program addition item 381 is selected, the control unit 170 may add the broadcast program being currently played back to the favorites program list and simultaneously display a thumbnail image corresponding to the added broadcast program on the favorites program button 333. In this manner, the user can easily confirm that the broadcast program being watched is added to the favorites program list. Additionally, the user may confirm the generation of the program addition icon corresponding to the program added to the favorites program list by selecting the favorites program button 333.

Additionally, if the program addition item 381 is selected, the control unit 170 may display a program addition notification message window 391, which notifies the addition of the broadcast program being watched to the favorites program list, on the broadcast program display region 310 for a predetermined time.

According to another embodiment of the present invention, the remote control device 200 may include a program add button (not shown). The display device 100 may receive a command corresponding to an input of selecting the program add button of the remote control device 200, and add a broadcast program being currently played back to the favorites program list according to the received command.

On the other hand, if the channel addition item 383 is selected, the control unit 170 may add the channel of the broadcast program being currently played back to the favorites channel list. This will be described below with reference to FIG. 20.

Referring to FIG. 20, if the channel addition item 383 is selected, the control unit 170 may add the channel of the broadcast program being currently played back to the favorites channel list. If the program addition item 383 is selected, the control unit 170 may add the channel of the broadcast program being currently played back to the favorites program list and simultaneously display the name of the added channel on the favorites channel button 331. In this manner, the user can easily confirm that the channel of the broadcast program being watched is added to the favorites channel list. Additionally, the user may confirm the generation of the channel addition icon corresponding to the channel added to the favorites channel list by selecting the favorites channel button 331.

Additionally, if the channel addition item 383 is selected, the control unit 170 may display a channel addition notification message window 393, which notifies the addition of the channel of the broadcast program being watched to the favorites channel list, on the broadcast program display region 310 for a predetermined time.

According to further another embodiment of the present invention, the remote control device 200 may include a channel add button (not shown). The display device 100 may receive a command corresponding to an input of selecting the channel add button of the remote control device 200, and add a channel of a broadcast program being currently played back to the favorites channel list according to the received command.

According to still further another embodiment of the present invention, a favorites addition item (not shown) for simultaneously adding a broadcast program being currently played back and a channel of the broadcast program to the favorites list may be further displayed in the broadcast program display region 310. If the favorites addition item is selected, the control unit 170 may add the broadcast program being currently played back to the favorites program list and add the channel of the broadcast program being currently played back to the favorites channel list.

According to another embodiment of the present invention, if media content stored in a peripheral device connected to the display device 100 is played back in the display device 100, the display device 100 may add the media content being played back to the favorites list. That is, if the media content stored in the peripheral device is played back in the broadcast program display region 310, a content addition item (not shown) may be further displayed. If the content addition item is selected, the control unit 170 may add the media content being played back to the favorites content list. As another example, then the content addition item is selected, the control unit 170 may add the media content being played back to the favorites program list instead of the favorites content list.

According to further another embodiment of the present invention, the display device 100 may provide the favorites list corresponding to each user. The display device 100 may identify a user by receiving user information and provide a favorites list corresponding to the identified user. In an embodiment, the display device 100 may further include a camera and identify a user by using an image of the user captured through the camera. In another embodiment, the display device 100 may be connected to a mobile terminal (smart phone or smart pad) of a user through short-range wireless communication and may identify the mobile terminal of the user. In another embodiment, the display device 100 may identify a user by using fingerprint information of the user which is received through the fingerprint recognition unit 210 provided in the remote control device 200.

The display device 100 may provide the favorites list corresponding to the identified user, specifically, the favorites program list and the favorites channel list.

Figure 21:
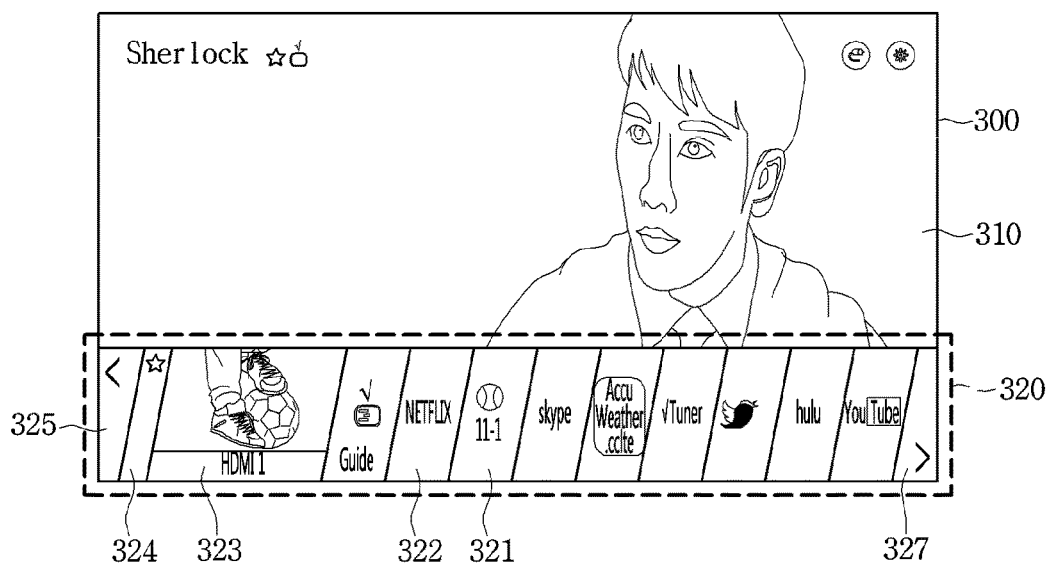
FIGS. 21 and 22 are views for describing an embodiment which provides a recently played-back media content list, according to an embodiment of the present invention.
Figure 22:
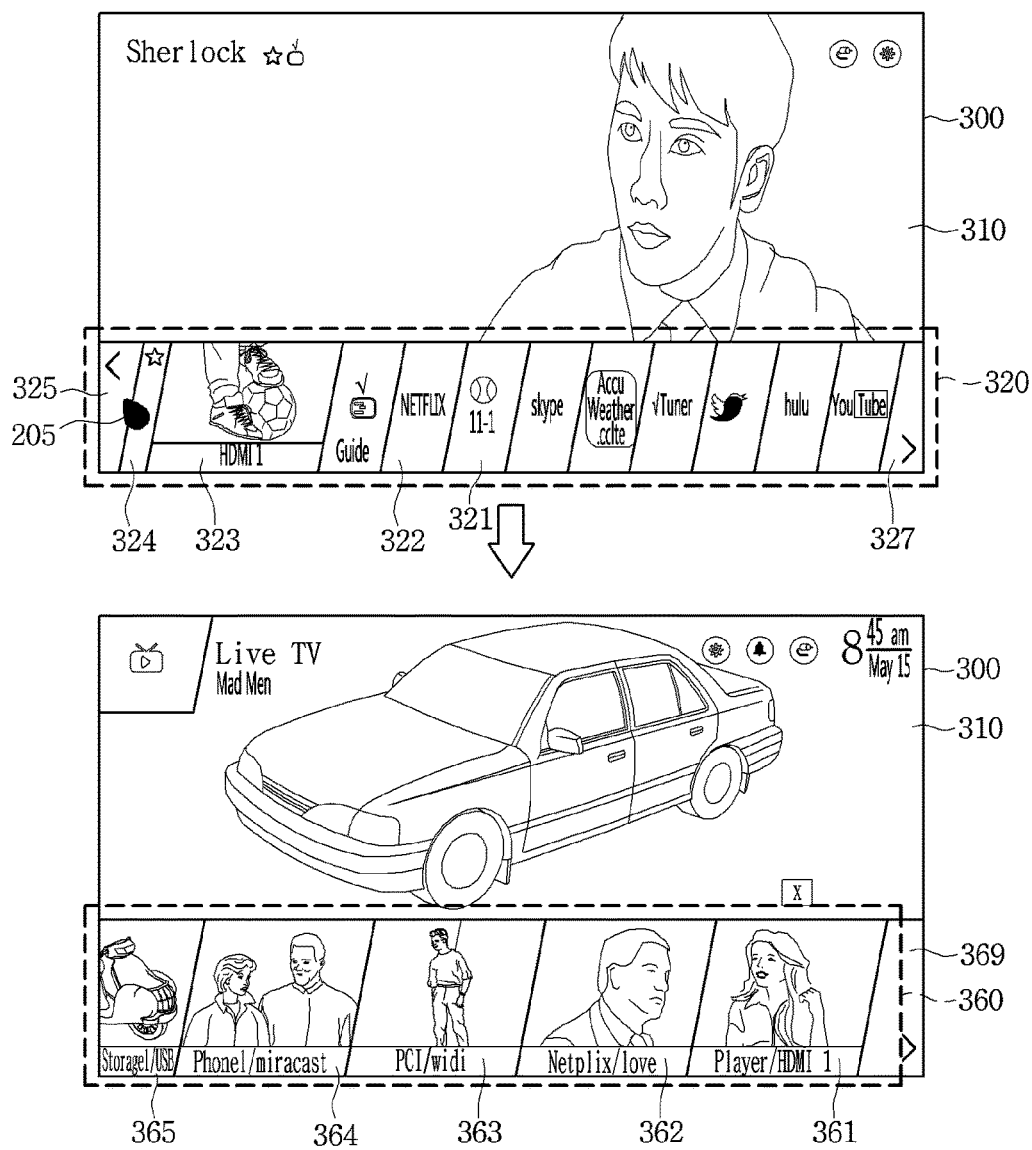

Next, FIGS. 21 and 22 are described.

FIGS. 21 and 22 are views for describing an embodiment which provides a recently played-back media content list, according to an embodiment of the present invention.

Referring to FIG. 21, as compared with FIG. 6, a recent icon 325 and a scroll icon 327 are further added to the service display region 320. The other contents are identical to those described with reference to FIG. 6.

The recent icon 325 may be an icon for providing information on the media content recently played back in the display device 100 and information on a source providing the played-back media content. The scroll icon 327 may be an icon for further displaying content provider icons indicating content providers. This will be described below.

Referring to FIG. 22, if a request to select the recent icon 325 is selected through the pointer 205, the control unit 170 may control the display unit 180 to display a recent access list 360 on the screen 300.

As another example, the recent access list 360 may be displayed on the screen 300 through the remote control device 200, without displaying the recent icon 325. Specifically, the remote control device 200 may include a specific button for providing the recent access list 360. If the specific button is selected (or selected for a preset time), the control unit 170 may output the recent access list 360 according to a command for outputting the recent access list which is received from the remote control device 200, as shown in FIG. 22.

The recent access list 360 may include a plurality of image cards 361 to 365 including information on the recently played-back media content. The plurality of image cards 361 to 365 may be arranged in recently played-backed order. For example, the first image 361 is a card corresponding to the most recently played-back media content, and the second image card 362, the third image card 363, the fourth image card 364, and the fifth image card 365 may be followed.

Each image card may correspond to the media content recently played back in the display device 100. A thumbnail image corresponding to the recently played-back media content and a name of a content source identifying a source providing the media content may be displayed on each image card. Each image card may be included in the recent access list 360 only if the corresponding media content is played back for more than a predetermined time.

The first mage card 361 may include a thumbnail image corresponding to media content provided in an HDMI 1 port, a name (HDMI 1) of an external input port, and a name (player) of a terminal connected to the external input port.

Here, the terminal may be any one of DVR, DVD, a game machine, and a Blu-ray player.

The second mage card 362 may include one or more of a thumbnail image corresponding to media content provided from a content provider corresponding to a recently played-back application, a name (Netflix) of the content provider, and a title (love) of the media content.

The third image card 363 may include a thumbnail image corresponding to media content provided in a PC through a Wireless Display (WIDI) and a name PC1 of a content source. The third image card 363 may further include information on the communication standard WIDI as well as the name PC1 of the content source.

The fourth image card 364 may include a thumbnail image corresponding to media content provided in a mobile terminal such as a smart phone through screen mirroring and a name phone1 of a content source. The fourth image card 364 may further include information on a screen mirroring technology called miracast as well as the name phone1 of the content source.

The fifth image card 365 may include a thumbnail image corresponding to media content stored in a USB storage medium and a name storage1 of a content source. The fifth image card 365 may further include information on the communication standard USB as well as the name storage1 of the content source.

On the other hand, the recent access list 360 may also include an image card for a recently watched broadcast program. If a broadcast program is played back for more than a predetermined time, the control unit 170 may include an image card including information on the broadcast program to the recent access list 360. In this case, the information on the broadcast program may include one or more of a thumbnail image of the broadcast program, a title of the broadcast program, a broadcasting company, and a channel number of the broadcast program. If the image card for the recently watched broadcast program is included in the recent access list 360, a catch-up icon (not shown) may be further included within the corresponding image card or on one side of the corresponding image card. The catch-up icon may be an icon for providing information on a broadcast program corresponding to a previous episode of a broadcast program provided on a corresponding channel. Embodiments described below with reference to FIGS. 32 to 42 will be applied to the catch-up icon.

If one of the image cards is selected on the recent access list 360, the control unit 170 may play back media content corresponding to the image card.

On the other hand, if a return button 369 is selected, it is possible to return to a previous screen.

Next, FIGS. 23 and 24 are described.

FIG. 23 is a view for describing an embodiment which deletes an image card on a recent access list, according to an embodiment of the present invention, and FIG. 24 is a view for describing an embodiment which registers an image card as favorites on a recent access list.

If the pointer 205 is located on the first image card 361, the control unit 170 may control the display unit 180 to display a delete icon 366 and a favorites register icon 367 on one side of the first image card 361. The delete icon 366 may be an icon for deleting a corresponding image card on the recent access list 360. The favorites register icon 367 may be an icon for adding a corresponding image card to the favorites list on the recent access list 360. Referring to FIG. 23, if the delete icon 366 disposed above the first image card 361 is selected, the control unit 170 may delete the first image card 361 from the recent access list 360.

Referring to FIG. 24, if the favorites register icon 367 disposed above the first image card 361 is selected, the control unit 170 may add the first image card 361 included in the recent access list 360 to the favorites list. The control unit 170 may add the first image card 361 to the favorites list and simultaneously display a message window 392, which notifies the addition of the first image card 361 to the favorites list, on the screen 300.

The favorites list may be output through entry of a separate menu screen or may be output through an input of a specific button provided in the remote control device 200.

Figure 25:
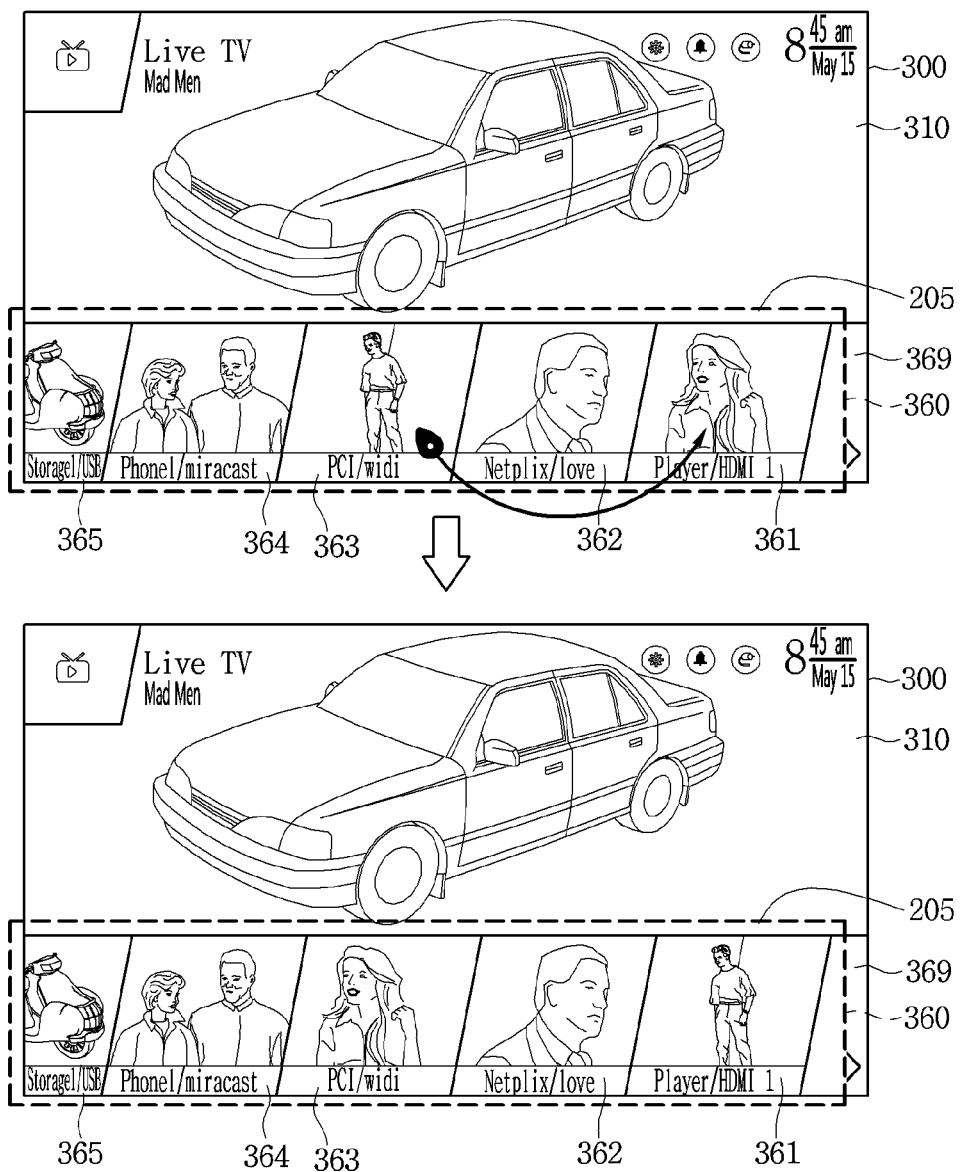
FIG. 25 is a view for describing an embodiment which changes a position of an image card included on a recent access list, according to an embodiment of the present invention.

Next, FIG. 25 is described.

FIG. 25 is a view for describing an embodiment which changes a position of an image card included on a recent access list, according to an embodiment of the present invention.

Referring to FIG. 25, if the pointer 205 is located on the third image card 363 and an input of selecting the third image card 363 is received through the remote control device 200 for more than a predetermined time, the control unit 170 may make a position of the third image card 363 movable. For example, if the third image card 363 is selected for more than a preset time and an input of moving the third image card 363 to a region where the first image card 361 is located is received, the control unit 170 may change the arrangement of the third image card 363 and the first image card 361. That is, the user can arrange its preferred image card to a desired position.

Figure 26:
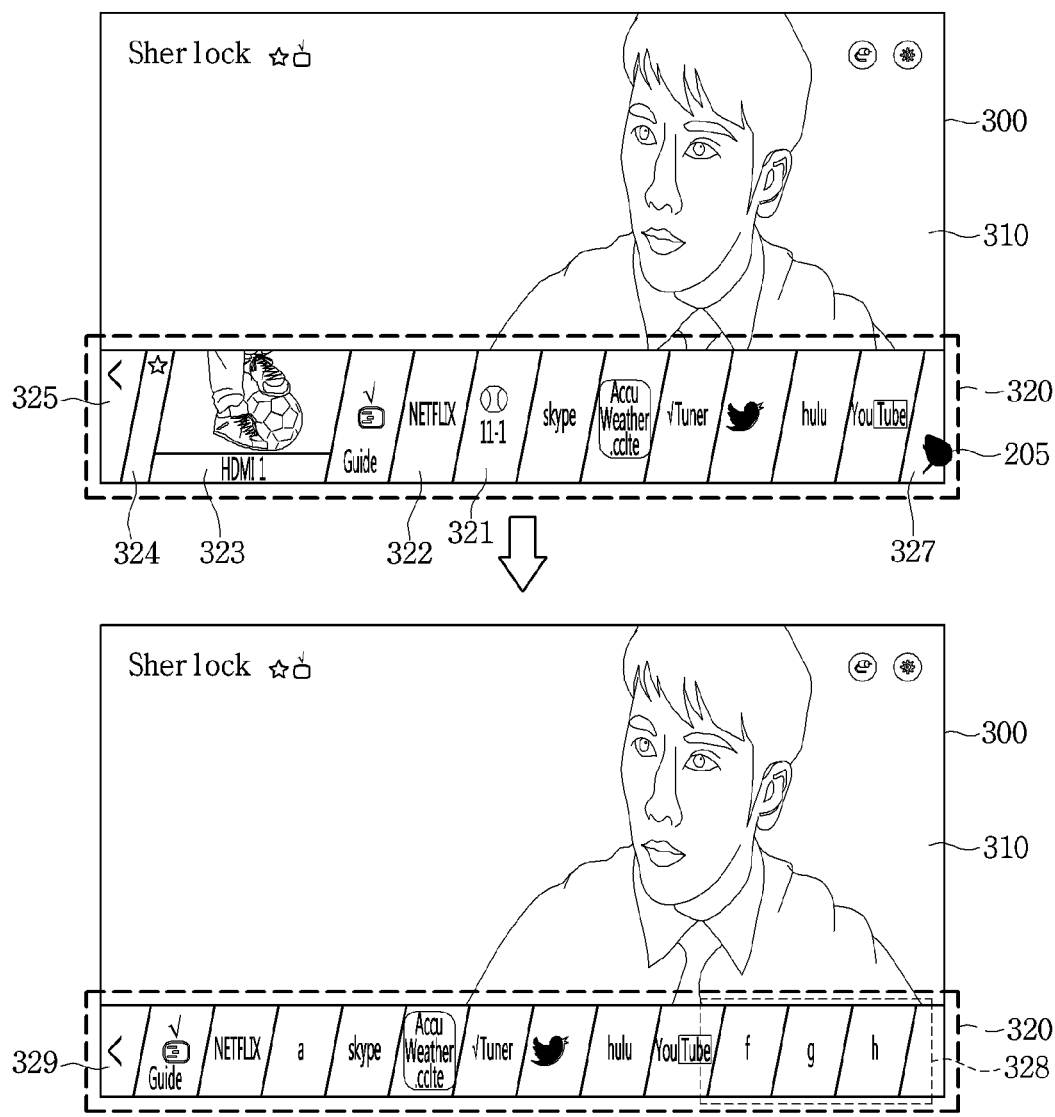
FIG. 26 is a view for describing an embodiment which further provides additional content provider icons, according to an embodiment of the present invention.

Next, FIG. 26 is described.

FIG. 26 is a view for describing an embodiment which further provides additional content provider icons, according to an embodiment of the present invention.

Referring to FIG. 26, if the scroll icon 327 is selected through the pointer 205, the control unit 170 may additionally display the content provider icons 328 on the service display region 320. Accordingly, the sizes of the content provider icons included in the existing service display region 320 may be reduced. On the other hand, if a return button 329 is selected, it is possible to return to a previous screen.

Like the change of the arrangement of the image cards described with reference to FIG. 25, the arranged order of the plurality of icons may be changed by using the pointer 205.

Figure 27:
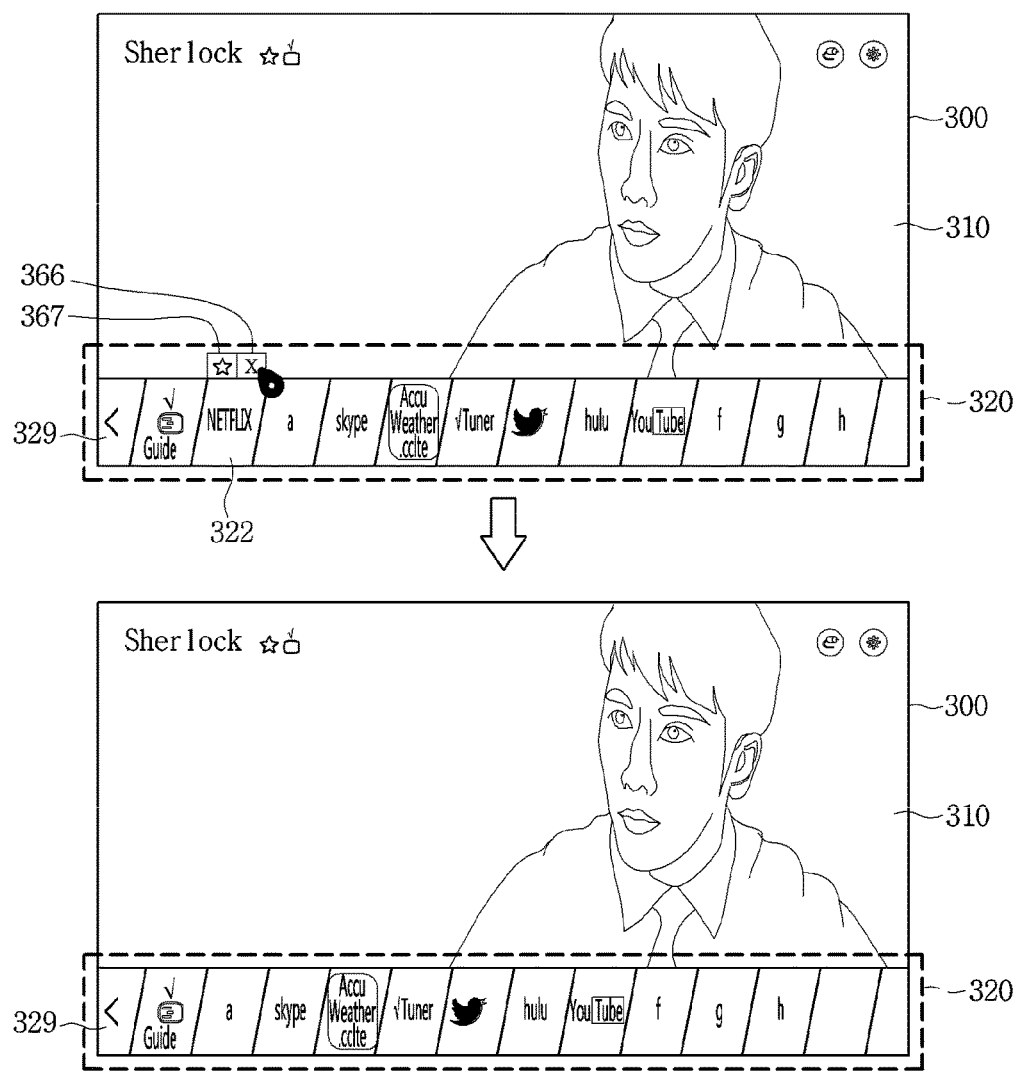
FIG. 27 is a view for describing an embodiment which deletes an icon on a service display region, according to an embodiment of the present invention.
Figure 28:
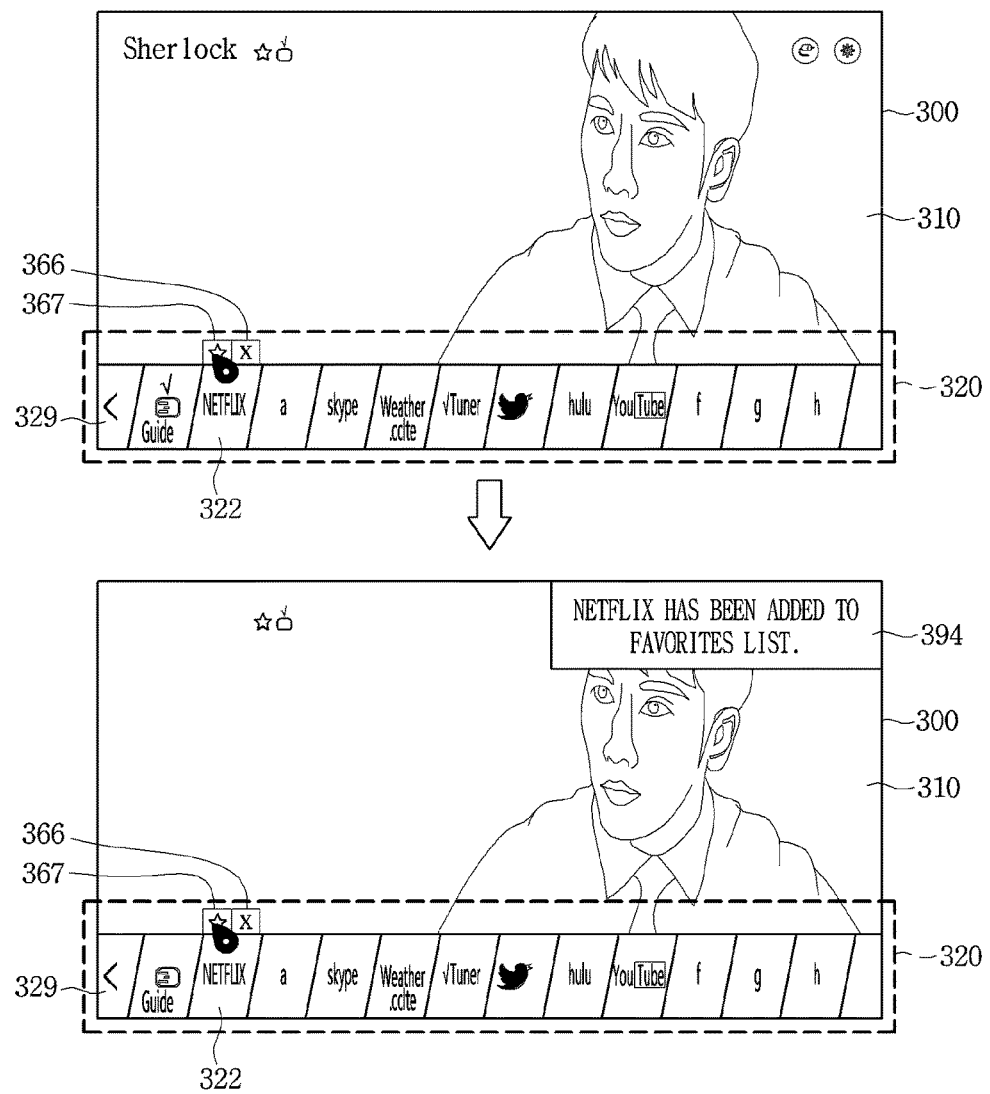
FIG. 28 is a view for describing an embodiment which adds an icon to a favorites list on a service display region, according to an embodiment of the present invention.

Next, FIGS. 27 and 28 are described.

FIG. 27 is a view for describing an embodiment which deletes an icon on the service display region 320, according to an embodiment of the present invention, and FIG. 28 is a view for describing an embodiment which adds an icon to a favorites list on the service display region 320, according to an embodiment of the present invention.

Referring to FIG. 27, if the pointer 205 is located on the content provider icon 322, the control unit 170 may control the display unit 180 to display the delete icon 366 and the favorites register icon 367 on one side of the content provider icon 322. The delete icon 366 may be an icon for deleting a corresponding icon on the service display region 320. The favorites register icon 367 may be an icon for adding a corresponding icon to the favorites list on the service display region 320.

Referring to FIG. 27, if the delete icon 366 disposed above the content provider icon 322 is selected, the control unit 170 may delete the content provider icon 322 in the service display region 320.

Referring to FIG. 28, if the favorites register icon 367 disposed above the content provider icon 322 is selected, the control unit 170 may add the content provider icon 322 to the favorites list. The control unit 170 may add the content provider icon 322 to the favorites list and simultaneously display a message window 394, which notifies the addition of the content provider icon 322 to the favorites list, on the screen 300.

The favorites list may be output through entry of a separate menu screen or may be output through an input of a specific button provided in the remote control device 200.

An embodiment which provides a favorites list and a recent access list, according to another embodiment of the present invention, will be described with reference to FIGS. 29 to 31.

Figure 29:
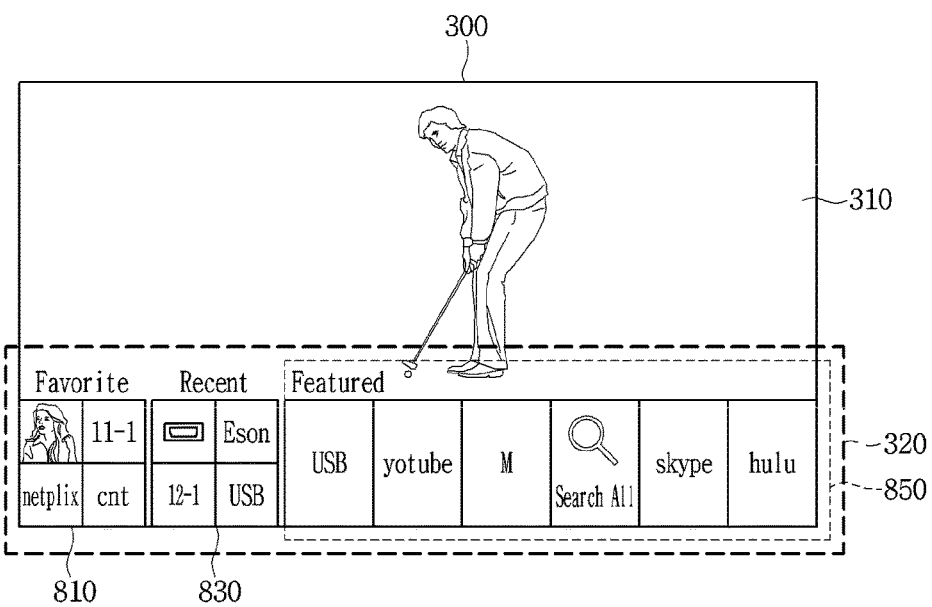
FIGS. 29 to 31 are views for describing an embodiment which provides a favorites list and a recent access list, according to another embodiment of the present invention.

Referring to FIG. 29, the control unit 170 may display a favorites card 810, a recent access card 830, and a basic service list 850 on the service display region 320 according to a request to output cards and a list during playback of a broadcast program. In an embodiment, the favorites card 810 may be disposed at the leftmost of the service display region 320, and the recent access card and the basic service list 850 may be followed. However, this is merely an example, and the position of the card may be changed through the pointer.

The favorites card 810 may include at least one content item. Each content item may include any one of information on an application registered as favorites, information on a broadcast program registered as favorites, information on media content registered as favorites, and information on a channel registered as favorites. The favorites card 810 may include the broadcast program added as favorites in the embodiment of FIG. 19 and the channel added as favorites in the embodiment of FIG. 20. Additionally, the favorites card 810 may include the first image card 361 added as favorites in the embodiment of FIG. 24 and the content provider icon 322 added as favorites in the embodiment of FIG. 28.

A name <Favorite> identifying the favorites card 810 may be displayed on one side of the favorites card 810. The favorites card 810 includes four content items, but this is merely an example. The four content items included in the favorites card 810 may be four items located at the leftmost among content items arranged on the favorites list 811 described below.

The recent access card 830 may include at least one content item. Each content item may include any one of information on recently played-back media content, information on a recently executed application, information on a recently played-back broadcast program, and information on a recently played-back channel. The recent access card 830 may include the image cards described in the embodiment of FIG. 22.

A name <Recent> identifying the recent access card 830 may be displayed on one side of the recent access card 830. The recent access card 830 includes four content items, but this is merely an example. The four content items included in the recent access card 830 may be four items located at the leftmost among content items arranged on the recent access list 831 described below. In another example, the recent access card 830 may be four items accessed most recently.

The basic service list 850 may include a plurality of icons. Each icon may include an icon corresponding to a content provider providing content via a network, an icon for setting the function of the display device 100, and a search icon for searching for media content or applications.

Figure 30:
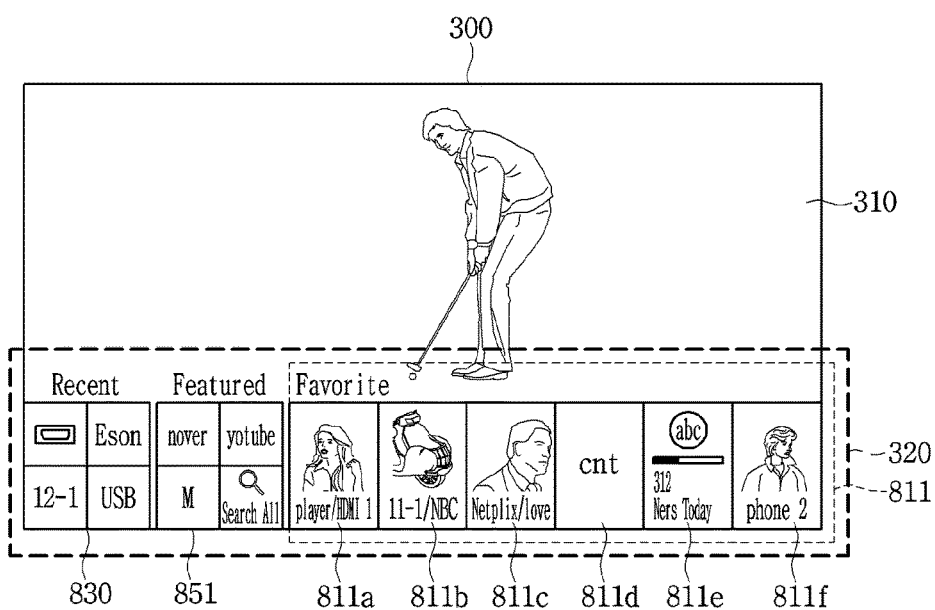

In the state of FIG. 29, if a request to select the favorites card 810 is received, the control unit 170 may control the display unit 180 to display the favorites list 811 including a plurality of content items belonging to the favorites card 810, as shown in FIG. 30. Simultaneously, the control unit 170 may move the position of the recent access card 830 to the leftmost of the service display region 320. Simultaneously, the control unit 170 may change the basic service list 850 to the basic service card 851 and arrange the basic service card 851 to follow the recent access card 830. Simultaneously, the control unit 170 may change the favorites card 810 to the favorites list 851 and arrange the favorites list 811 to follow the basic service card 851. The basic service card 851 may include only four content items among content items included in the basic service list 850, but this is merely an example.

The favorites list 811 may include more content items than the content items included in the favorites card 810.

One or more of the name (HDMI 1) of the external input, the name (player) of the peripheral device connected to the external input, and the thumbnail image of the media content played back through the external input may be displayed on the first content item 811*a*. The first content item 811*a* may be the first image card added as favorites in the embodiment of FIG. 24.

One or more of the channel of the broadcast channel, the broadcasting company, and the thumbnail image of the broadcast program may be displayed on the second content image 811*b*.

One or more of the name of the application (or the name of the content provider), the title (love) of the media content played back through the application, and the thumbnail image of the media content may be displayed on the third content item 811*c*.

The fourth content item 811*d* may be the content provider icon added as favorites in the embodiment of FIG. 28.

The fifth item 811*e* may include on the channel added as favorites in the embodiment of FIG. 20. The fifth content item 811*e* may be the channel icon in FIGS. 8 and 9.

One or more of the name (phone 2) of the peripheral device connected to the display device 100 by wireless or wire and the thumbnail image of the media content stored in the peripheral device and played back by the display device 100 may be displayed on the sixth content item 811*f*. In one example, the media content may be content played back through the screen mirroring technology.

The plurality of content items 811*a* to 811*f* included in the favorites list 811 may be arranged according to time points if they have been registered as favorites. That is, the first content item 811*a* may be an icon most recently registered as favorites, and the sixth content item 811*f* may be an item registered last as favorites. The position of each content item may be changed according to the setting of the user. An example of changing the position of the content item may be identical to the method of changing the position of the image card as described with reference to FIG. 25.

Figure 31:
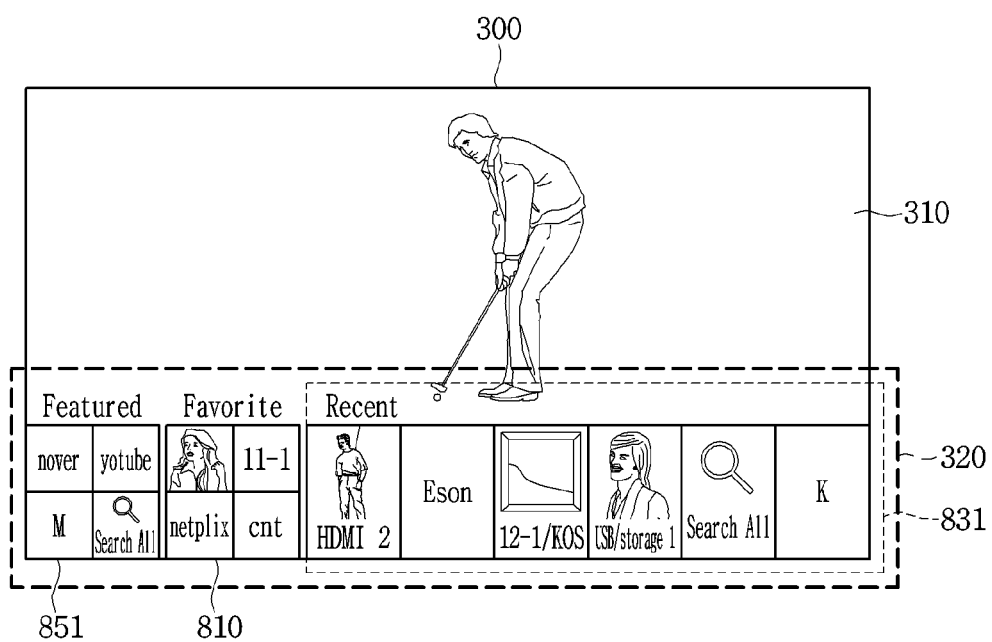

On the other hand, in the state of FIG. 30, if a request to select the recent access card 830 is received, the control unit 170 may control the display unit 180 to display the recent access list 831 including a plurality of content items belonging to the recent access card 830, as shown in FIG. 31. Simultaneously, the control unit 170 may move the position of the basic service card 851 to the leftmost of the service display region 320. Simultaneously, the control unit 170 may change the favorites list 811 to the favorites card 810 and arrange the favorites card 810 to follow the basic service card 851. Simultaneously, the control unit 170 may change the recent access card 830 to the recent access list 831 to follow the favorites card 810.

The recent access list 831 may include more content items than the content items included in the recent access card 830. The recent access list 831 may be identical to the recent access list 360 described with reference to FIGS. 22 to 25, and the embodiments of FIGS. 22 to 25 may be applied thereto. That is, the content items included in the recent access list 831 may be added to the favorites card 810 through the favorites addition function. Also, the content items included in the recent access list 831 may be deleted on the recent access list 831 through the deletion function.

Figure 32:
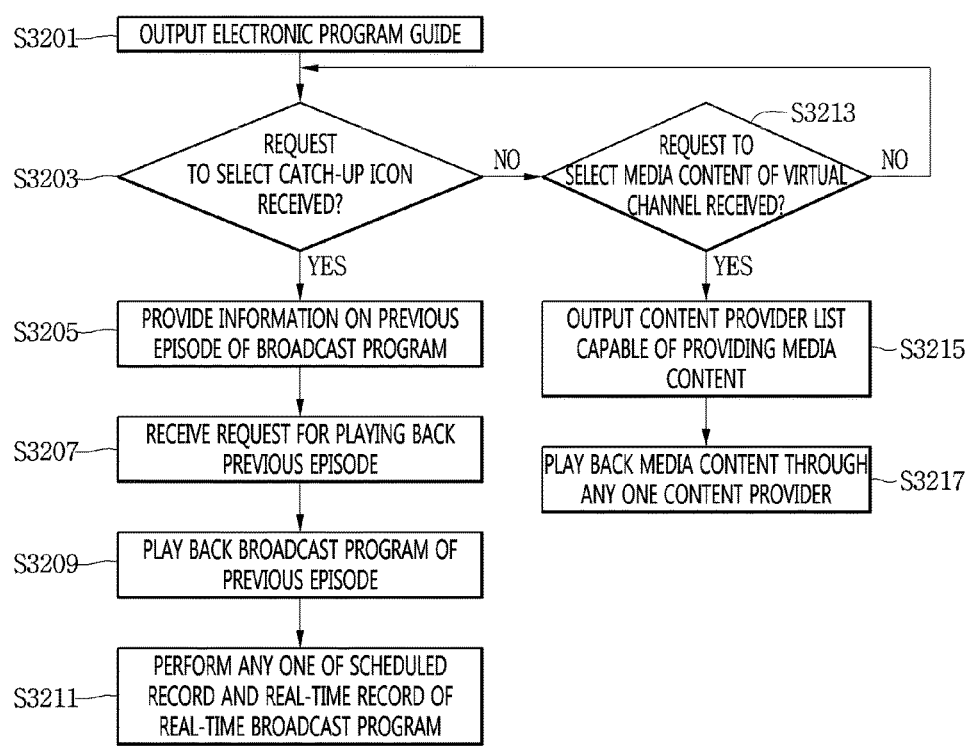
FIG. 32 is a flowchart of an operating method of a display device, according to another embodiment of the present invention.

FIG. 32 is a flowchart of an operating method of a display device, according to another embodiment of the present invention.

First, the control unit 170 of the display device 100 outputs an electronic program guide (EPG) (S3201). The EPG may be a menu screen that guides information on the broadcast program and the information on additional service to the user. In an embodiment, the control unit 170 may output the EPG through the display unit 180 according to a command received from the remote control device 200. That is, the control unit 200 may include an EPG view button. If the EPG view button is selected, the control unit 170 may display the EPG through the display unit 180.

In another embodiment, the control unit 170 may display the EPG through the display unit 180 according to a command of selecting the EPG view icon (not shown) included in the service display region 320 shown in FIG. 6.

The control unit 170 of the display device 100 checks whether a request to select a catch-up icon on the output EPG is received (S3203), and provides information on a previous episode of a corresponding broadcast program if the request to select the catch-up icon is received (S3205).

The EPG may include information on general channels and information on virtual channels. The general channels may be channels on which the broadcasting company provides broadcast programs. In an embodiment, the virtual channels may be channels which provide media content through a specific content provider or a TV manufacturer. In further another embodiment, the virtual channels may be channels generated based on a watching history of a user, regardless of the content provider or the TV manufacturer. The watching history of the user may reflect genre of content which the user has most watched. In further another embodiment, the media content to be provided in the virtual channel may be determined according to an edge input of the user. In still further another embodiment, the media content to be provided in the virtual channel may belong to one genre.

The user may compare medial content, which can be directly watched in the virtual channel, as well as the broadcast programs provided in the general channels through the information on the virtual channels. Accordingly, the user may flexibly make its own watching plan and may watch the media content in a wider range as well as live broadcast.

The EPG may include information on the broadcast programs or media content provided according to the flow of time at each channel. According to an embodiment of the present invention, the information on the general channels may include information on previous episodes of the broadcast program provided in the corresponding channel.

The EPG will be described in detail with reference to FIG. 33.

Figure 33:
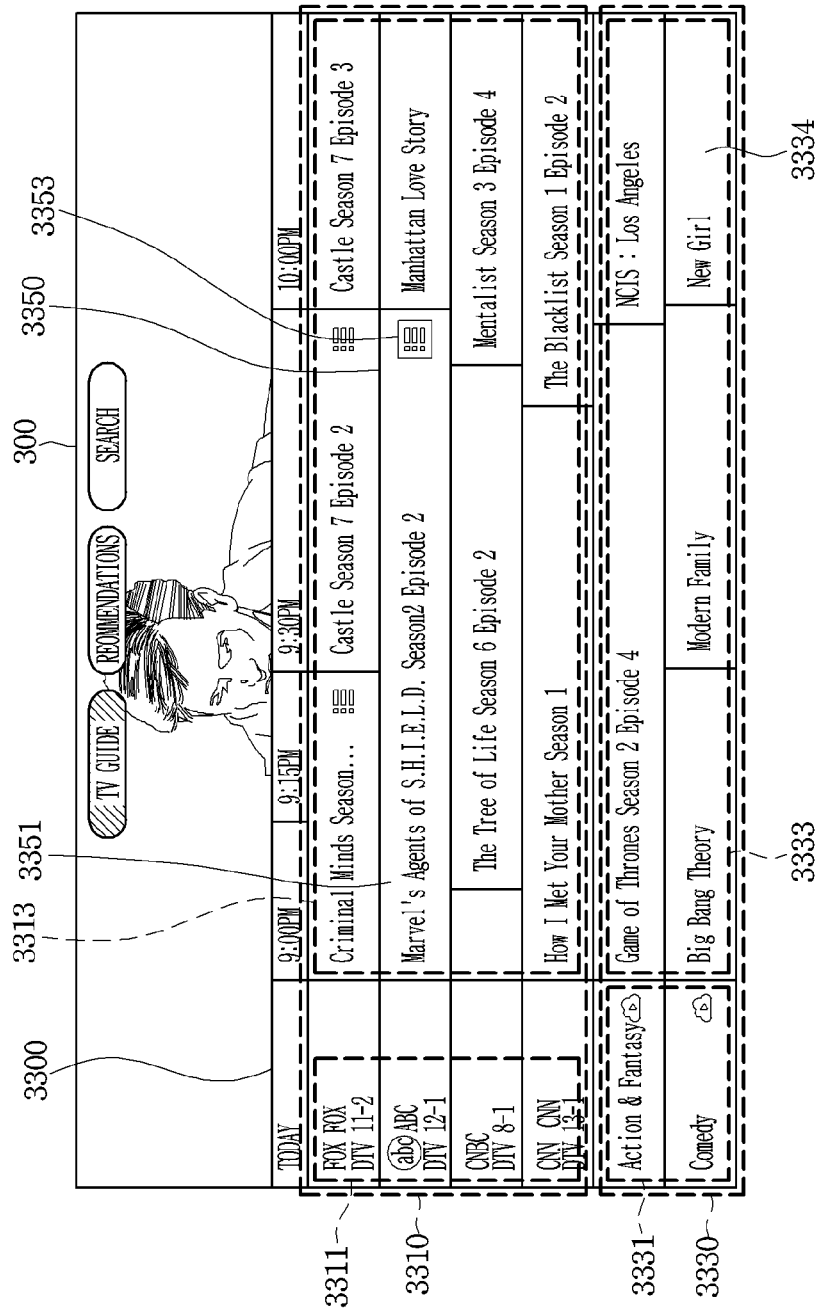
FIG. 33 is a view for describing a configuration of an electronic program guide according to an embodiment of the present invention.

FIG. 33 is a view for describing a configuration of an EPG according to an embodiment of the present invention.

Referring to FIG. 33, the display device 100 may receive a request for displaying the EPG during the playback of the broadcast program and display the EPG 3300 on the screen 300 according to the received request. The EPG 3300 may be displayed to overlap the broadcast program being played back on the screen 300.

The EPG 3300 may include a general channel region 3310 and a virtual channel region 3330. Broadcast programs provided in each general channel may be arranged in the general channel region 3310 according to the flow of time. Media content or broadcast programs provided in each virtual channel may be arranged in the virtual channel region 3330 according to the flow of time.

The general channel region 3310 may include a general channel list region 3311 and a broadcast program list region 3313. The general channel list region 3311 may be a region for providing information on the general channels. The general channel list region 3311 may include names of broadcasting companies providing a plurality of general channels and general channel numbers. The broadcast program list region 3313 may include information on broadcast programs provided in each general channel according to temporal order. The information on the broadcast programs may include a broadcasting time of the broadcast program, a title of the broadcast program, and an information icon for providing detailed information of the broadcast program. This will be described below.

The virtual channel region 3330 may include a virtual channel list region 3331 and a media content list region 3333. The virtual channel list region 3331 may be a region for providing information on the virtual channels. The virtual channel list region 3331 may include one or more of a genre of media content corresponding to each of the virtual channels and a name of a content provider providing each of the virtual channels. The media content list region 3333 may include information on media content provided in each virtual channel according to temporal order. The information on the media content may include a broadcasting time of the media content, a title of the media content, and an information icon for providing detailed information of the media content.

The general channel list region 3313 may include a plurality of broadcast program regions. Each broadcast program region may include one or more of a title of a broadcast program and an information icon. For example, the first broadcast program region 3350 may include a title 3351 of the broadcast program, <Marvels Agents of SHIELD Season 2 Episode 2>, and a catch-up icon 3353. The broadcast program region will be described in detail with reference to FIGS. 34 to 36.

Figure 36:
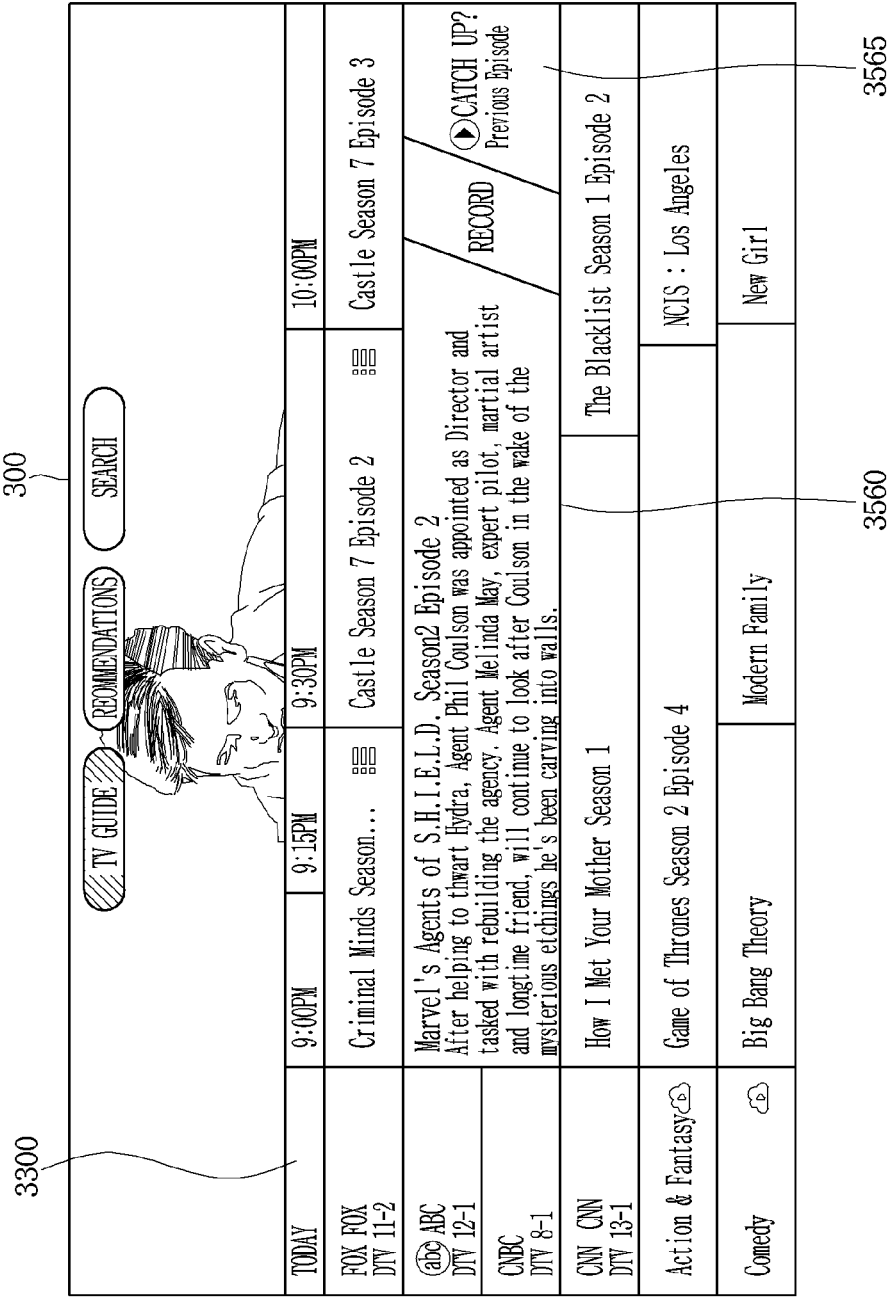

FIGS. 34 to 36 are views for describing information provided in a broadcast program region, according to an embodiment of the present invention.

It is assumed that a broadcast program shown in FIG. 34 supports a catch-up function. The catch-up function may be a function of providing information on previous episodes of a corresponding broadcast program and allowing a user to watch the previous episodes.

First, referring to FIG. 34(*a*), the first broadcast program region 3350 may include a title 3351 of a broadcast program and a catch-up icon 3353. The first broadcast program region 3350 may be divided into a region corresponding to the title 3351 of the broadcast program and a region corresponding to the catch-up icon 3353. If a request to select the title 3351 of the broadcast program is received, the control unit 170 may change a channel to a channel of a broadcast program corresponding to the selected title 3351 of the broadcast program and play back the corresponding broadcast program. If a request to select the catch-up icon 3353 is received, the control unit 170 may display detailed information of the corresponding broadcast program including the information on the catch-up function.

Referring to FIG. 34(b), the first broadcast program region 3350 may further include a favorites icon 3354. The favorites icon 3354 may be an icon for adding the corresponding broadcast program to the favorites list. If the favorites icon 3354 is selected, the control unit 170 may add the corresponding broadcast program or the episode of the corresponding broadcast program to the favorites list. The favorites icon 3354 may be displayed in any one of the general channel list region 3311 and the virtual channel list region 3331.

Next, FIGS. 35 and 36 are described.

If the catch-up icon 3353 is selected in FIG. 35, the control unit 170 may change the first broadcast program region 3350 to a first broadcast program extension region 3560 and display the first broadcast program extension region 3560 as shown in FIG. 35. The first broadcast program extension region 3560 may be displayed on the EPG 3300 as shown in FIG. 36. In FIG. 36, the first broadcast program extension region 3560 is displayed by taking FIG. 35(a) as an example, but the example shown in FIG. 35(b) may also be displayed.

FIG. 35(a) is an example of a case where the corresponding broadcast program is broadcast live, and FIG. 35(b) is an example of a case where the corresponding broadcast program is scheduled to be broadcast.

First, referring to FIG. 35(a), the first broadcast program extension region 3560 may include a broadcast information button 3561 providing broadcast information of the corresponding broadcast program, a record button 3563, and a catch-up button 3565. A title of the broadcast program and a synopsis of the broadcast program may be included on the broadcast information button 3561. If the broadcast information button 3561 is selected, the control unit 170 may change a channel to a channel of a broadcast program corresponding to the selected broadcast information button 3561 and play back the corresponding broadcast program. If the record button 3563 is selected, the control unit 170 may record the corresponding broadcast program being broadcast live. If the catch-up button 3565 is selected, the control unit 170 may provide detailed information of the corresponding broadcast program and simultaneously provide a function of allowing a user to watch a previous episode of the corresponding broadcast program. This will be described below.

Referring to FIG. 35(b), if the corresponding broadcast program is scheduled to be broadcast, the first broadcast program extension region 3560 may include a broadcast information button 3561 providing broadcast information of the corresponding broadcast program, a scheduled record button 3567, a watching reserve button 3569, and a catch-up button 3565. The broadcast information button 3561 and the catch-up button 3565 are identical to those described with reference to FIG. 35(a). The scheduled record button 3567 may be a button for performing a scheduled record of a broadcast program scheduled to be broadcast. If the scheduled record button 3567 is selected, the control unit 170 may automatically record the corresponding broadcast program at a scheduled broadcast time of the corresponding broadcast program. The watching reserve button 3569 may be a button for reserving the watching of a broadcast program scheduled to be broadcast. If the watching reserve button 3569 is selected, the control unit 170 may play back the watching-reserved broadcast program at a scheduled broadcasting time of the corresponding broadcast program.

Figure 37:
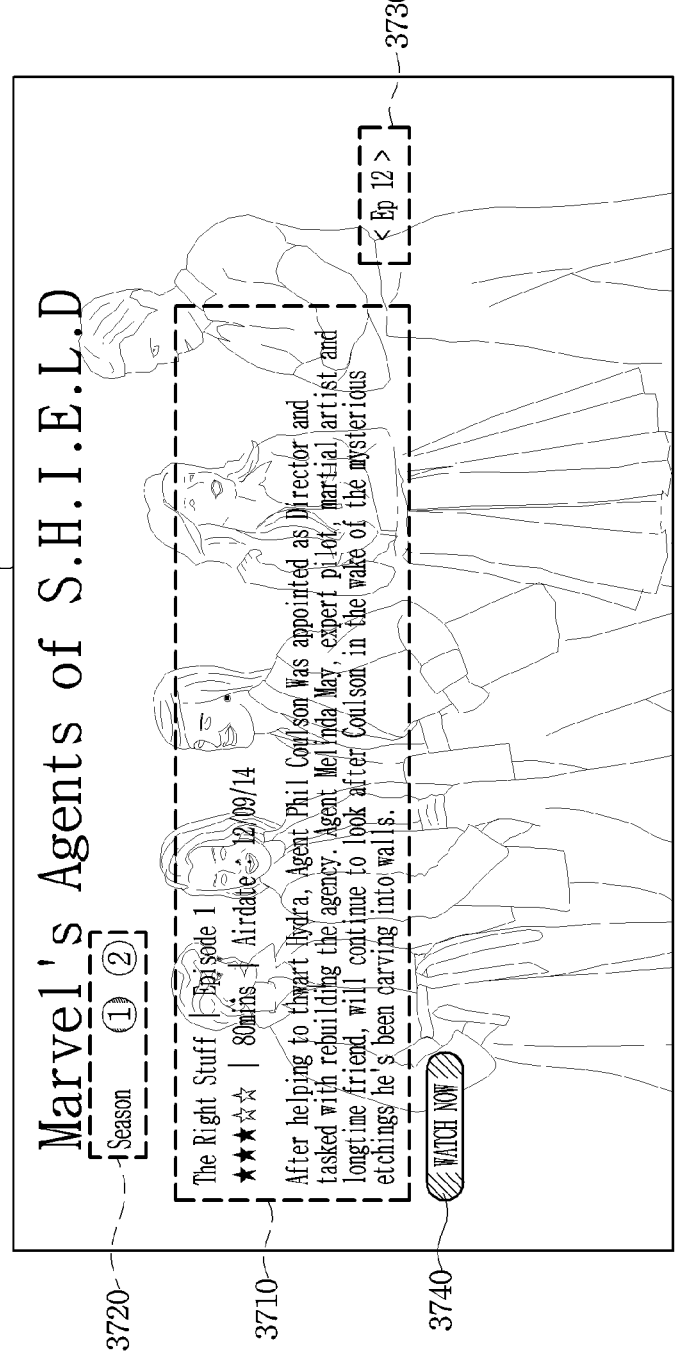
FIG. 37 is a view for describing information provided if a catch-up button is selected, according to an embodiment of the present invention.

Next, FIG. 37 is described.

FIG. 37 is a view for describing information provided if a catch-up button is selected, according to an embodiment of the present invention.

If the catch-up button 3565 of the first broadcast program region 560 is selected on the EPG 3300 of FIG. 36, the control unit 170 may provide a previous episode information screen 3700 of a broadcast program corresponding to the selected catch-up button 3565. The previous episode information screen 3700 may include a detailed information display region 3710, a season select button 3720, a previous episode select button 3730, and a playback request button 3740. The detailed information display region 3710 may be a region for providing information on a synopsis, a total playback time, a title, a broadcasting time, and the like of the corresponding broadcast program. The season select button 3720 may be a button for selecting a season of the corresponding broadcast program. The previous episode select button 3730 may be a button for providing information on a previous episode of the corresponding broadcast program. The playback request button 3740 may be a button for requesting the playback of the broadcast program of the season and episode selected through the season select button 3720 and the previous episode select button 3730. A thumbnail image of the corresponding broadcast program may be displayed on the background of the previous episode information screen 3700.

The user may directly watch the previous episode of the corresponding broadcast program through the catch-up function. The existing EPG shows only general information on the broadcast program. However, according to the embodiment of the present invention, the catch-up function is added to the EPG to thereby allow the user to easily watch the selected previous episode of the broadcast program. Additionally, according to the embodiment of the present invention, unlike the past watching pattern in which the user merely watches the given program, it is possible to provide the opportunity to allow the user to continuously watch the previous episodes of the broadcast program desired by the user according to the recent watching pattern in which the user selects only desired broadcast programs and continuously watch the selected broadcast programs.

On the other hand, if the catch-up function is not supported in the corresponding broadcast program, the catch-up icon may not be displayed in the broadcast program region. If the catch-up function is not supported in the corresponding broadcast program, the control unit 170 may control the display unit 180 to display the information icon, without displaying the catch-up icon. This will be described below with reference to FIG. 38.

FIG. 38 is a view for describing information provided in a broadcast program region if a catch-up function is not supported in a broadcast program, according to another embodiment of the present invention.

Referring to FIG. 38(a), the second broadcast program region 3800 may include a title 3801 of a broadcast program. Since the broadcast program corresponding to the second broadcast program region 3800 does not support the catch-up function, the catch-up icon may not be displayed. If a request to select the title 3801 of the broadcast program is received, the control unit 170 may change a channel to a channel of a broadcast program corresponding to the selected title 3801 of the broadcast program and play back the corresponding broadcast program.

Referring to FIG. 38(b), the second broadcast program region 3800 may further include an information icon 3803, in addition to the title 3801 of the broadcast program. The second broadcast program region 3800 may be divided into a region corresponding to the title 3801 of the broadcast program and a region corresponding to the information icon 3803. The information icon 3803 may be an icon for providing detailed information on the corresponding broadcast program. If the information icon 3803 is selected, the control unit 170 may provide detailed information on the broadcast program corresponding to the selected information icon 3803. This will be described below with reference to FIG. 39.

FIG. 39 illustrates an example of detailed information provided if an information icon is selected in a broadcast program region, according to another embodiment of the present invention.

If the information icon 3803 is selected in FIG. 38, the control unit 170 may change the second broadcast program region 3800 to a second broadcast program extension region 3900 and display the second broadcast program extension region 3900 as shown in FIG. 39. Instead of the second broadcast program region 3800, the second broadcast program extension region 3900 may be displayed on the EPG 3300.

FIG. 39(*a*) is an example of a case where the corresponding broadcast program is broadcast live, and FIG. 39(*b*) is an example of a case where the corresponding broadcast program is scheduled to be broadcast.

First, referring to FIG. 39(*a*), the second broadcast program extension region 3900 may include a broadcast information button 3901 providing broadcast information of the corresponding broadcast program and a record button 3903. A title of the broadcast program and a synopsis of the broadcast program may be included on the broadcast information button 3901. If the broadcast information button 3901 is selected, the control unit 170 may change a channel to a channel of a broadcast program corresponding to the selected broadcast information button 3901 and play back the corresponding broadcast program. If the record button 3903 is selected, the control unit 170 may record the corresponding broadcast program being broadcast live.

Referring to FIG. 39(*b*), the second broadcast program region 3900 may include a broadcast information button 3901, a scheduled record button 3905, and a watching reserve button 3907. The broadcast information button 3901 is identical to that described with reference to FIG. 39(*a*). The scheduled record button 3905 may be a button for performing a scheduled record of a broadcast program scheduled to be broadcast. If the scheduled record button 3905 is selected, the control unit 170 may automatically record the corresponding broadcast program at a scheduled broadcast time of the corresponding broadcast program. The watching reserve button 3907 may be a button for reserving the watching of a broadcast program scheduled to be broadcast. If the watching reserve button 3907 is selected, the control unit 170 may play back the watching-reserved broadcast program at a scheduled broadcasting time of the corresponding broadcast program.

According to further another embodiment of the present invention, if the information icon 3803 is selected, the control unit 170 may display a content provider list capable of providing episodes of the corresponding broadcast program. If any one content provider is selected through the content provider list, the control unit 170 may access the corresponding content provider and provide information on the previous episode of the corresponding broadcast program.

Again, FIG. 32 is described.

The control unit 170 of the display device 100 checks whether a request for playing back the broadcast program of the previous episode based on the provided information on the previous episode of the broadcast program is received (S3207), and plays back the broadcast program of the previous episode if the request for playing back the broadcast program of the previous episode is received (S3209). This will be described in more detail with reference to FIGS. 33 to 37.

The control unit 170 of the display device 100 performs any one of a scheduled record of a broadcast program and a real-time record while playing back the broadcast program of the previous episode (S3211). Operations S3209 and S3211 may be performed at the same time. Specifically, if the broadcast program of the previous episode is played back according to the catch-up function, the control unit 170 may recognize a current time and the broadcast program of the played-back previous episode and perform any one of a scheduled record or a real-time record of a live broadcast program. This will be described below with reference to FIGS. 40 to 42.

Figure 41:
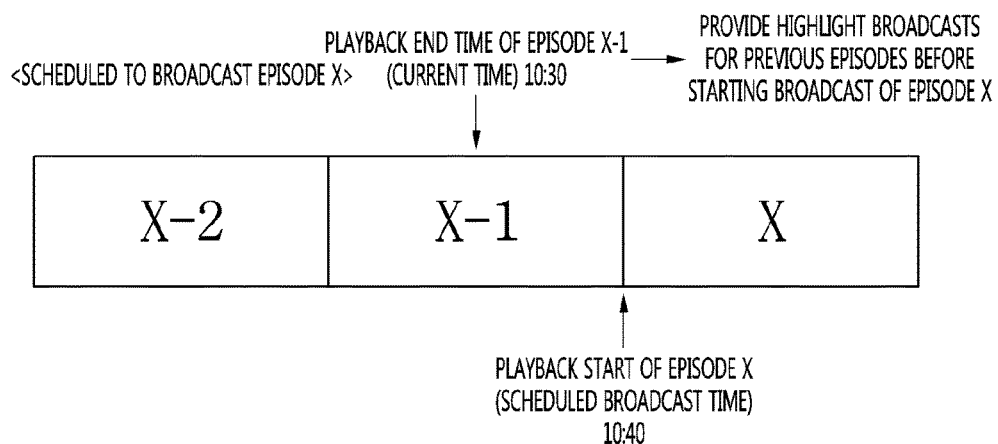
Figure 42:
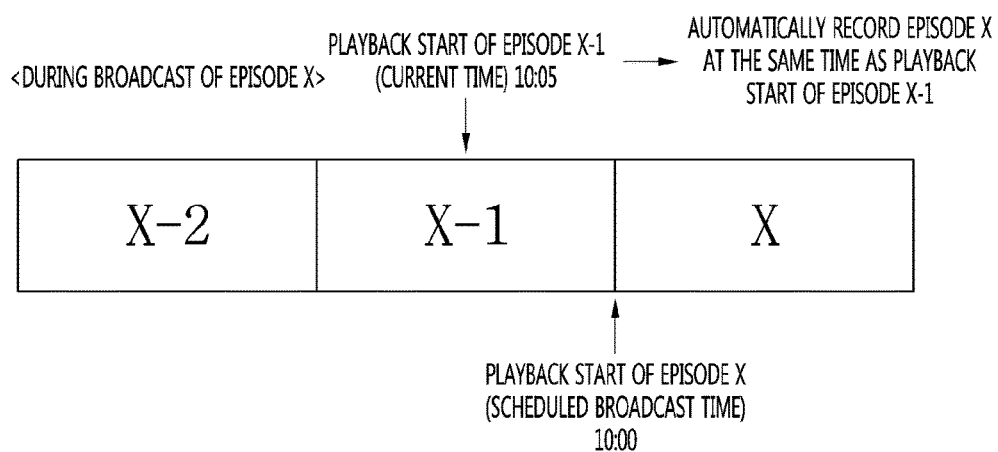

FIGS. 40 to 42 are views for describing various embodiments which may occur if a broadcast program of a previous episode is played back according to an execution of a catch-up function.

In the following, it is assumed that the episode of each broadcast program has a playback section of 1 hour.

First, FIGS. 40 and 41 are described.

FIGS. 40 and 41 are views for describing an embodiment which may occur if a previous episode X−1 of a broadcast program is played back, and a next episode X is scheduled to be broadcast.

Referring to FIG. 40, the broadcast program of the previous episode X−1 is being played back from 09:30 (current time) according to a playback request. A scheduled broadcasting time of the broadcast program of the next episode X is 10:00. If the time reaches 10:00, that is, the broadcasting time of the broadcast program of the next episode X during the playback of the broadcast program of the previous episode X−1, the control unit 170 may automatically record the episode X. That is, if the broadcast program of the previous episode is played back according to the catch-up function and the broadcast program of the next episode is scheduled to be broadcast, the control unit 170 may perform a scheduled record function on the broadcast program of the next episode. Then, if the broadcast program of the next episode starts to be broadcast, the control unit 170 may record the broadcast program of the next episode according to the set scheduled record function. If the playback of the broadcast program of the previous episode X−1 is completed, the control unit 170 may immediately play back the broadcast program of the next episode X. The user may watch series of the broadcast programs without stopping.

Next, FIG. 41 is described.

Referring to FIG. 41, the broadcast program of the previous episode X−1 was played back according to the playback request and the playback thereof was completed at 10:30 (current time). The broadcast program of the next episode X is scheduled to be broadcast from 10:40. The control unit 170 may play back a highlight broadcast of a previous episode X−2 or a preview of an episode X from the playback end time of the episode X−1 to the scheduled broadcasting time of the episode X (from 10:30 to 10:40). That is, if the playback of the broadcast program of the previous episode is completed according to the catch-up function and there is the time left until the scheduled broadcasting of the broadcast program of the next episode, the control unit 170 may play back a highlight broadcast of a broadcast program of a more previous episode or a preview of a broadcast program of a next period.

Next, FIG. 42 is described.

FIG. 42 is a view for describing an embodiment which may occur if an episode X is broadcast live at a playback time point of a previous episode X−1 of a broadcast program.

Referring to FIG. 42, the playback of the broadcast program of the previous episode X−1 was started according to the playback request (current time: 10:05). The broadcast program of the next episode X is being broadcast live from 10:00. The control unit 170 may automatically record the episode X at the same time as the playback start of the episode X−1. That is, if the broadcast program of the next episode is being broadcast live during the playback of the broadcast program of the previous episode, the control unit 170 may automatically record the broadcast program of the next episode at the same time as the playback start of the previous episode. Then, if the playback of the broadcast program of the previous episode X−1 is completed, the control unit 170 may immediately play back the broadcast program of the next episode X. The user may watch series of the broadcast programs without stopping.

Again, FIG. 32 is described.

On the other hand, if a request to select media content of a virtual channel is received (S3213), the control unit 170 of the display device 100 outputs a content provider list capable of providing the selected media content (S3215). The control unit 170 may recommend the content providers capable of providing the selected media content. This will be described below with reference to FIGS. 43 to 47.

FIGS. 43 to 47 are views for describing an embodiment which outputs a content provider list capable of providing media content of a virtual channel, according to various embodiments of the present invention.

Figure 43:
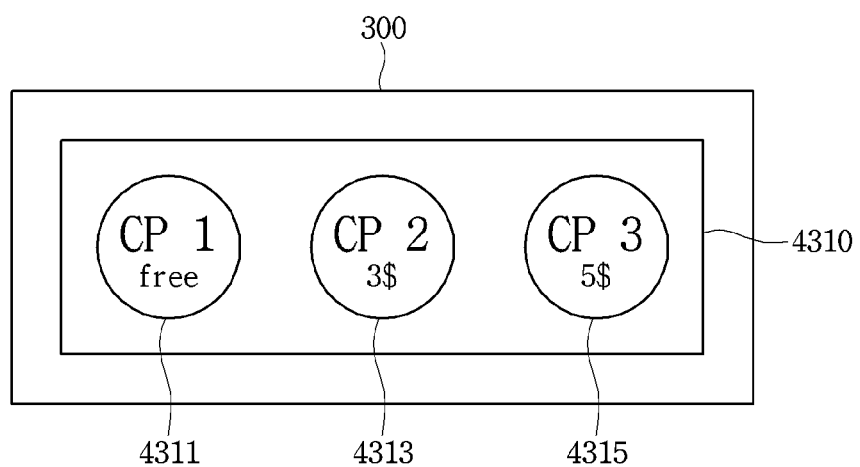

Next, FIG. 43 is described.

If media content 3334 <New Girl> is selected in the media content list region 3333 of FIG. 33, the control unit 170 may control the display unit 180 to display the content provider list 4310 on the screen 300 based on a purchase price of the media content, as shown in FIG. 43. The control unit 170 may arrange the content providers in ascending order of purchase price of media content. The first content provider 4311 provides the corresponding media content free of charge, the second content provider 4313 provides the corresponding media content at 3 dollars, and the third content provider 4315 provides the corresponding medial content at 5 dollars. The user may select the content provider, whose media content is to be played back, through the content provider list 4310 based on the purchase price of the media content.

In further another embodiment, the content provider list 4310 may include only the first content provider 4311 providing the selected media content at the lowest price.

Figure 44:
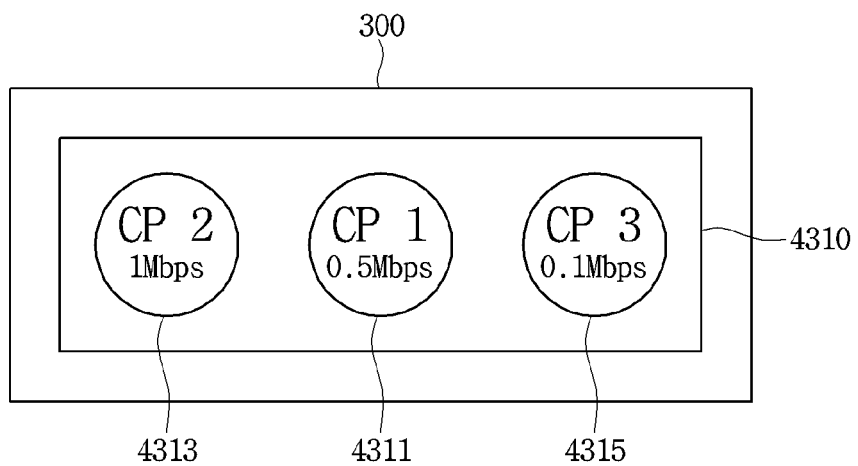

Next, FIG. 44 is described.

If media content 3334 <New Girl> is selected in the media content list region 3333 of FIG. 33, the control unit 170 may control the display unit 180 to display the content provider list 4310 on the screen 300 based on a network speed, as shown in FIG. 44. The network speed may be a transmission speed of media content of the content provider. The transmission speed of the media content includes the case of streaming the media content or the case of downloading the media content. The control unit 170 may arrange the content providers in descending order of the network speed. The second content provider 4313 provides the corresponding media content at a speed of 1 Mbps, the first content provider 4311 provides the corresponding media content at a speed of 0.5 Mbps, and the third content provider 4315 provides the corresponding medial content at a speed of 0.1 Mbps. The user may select the content provider, whose media content is to be played back, through the content provider list 4310 based on the network speed.

In further another embodiment, the content provider list 4310 may include only the second content provider 4313 providing the selected media content at the highest speed.

Figure 45:
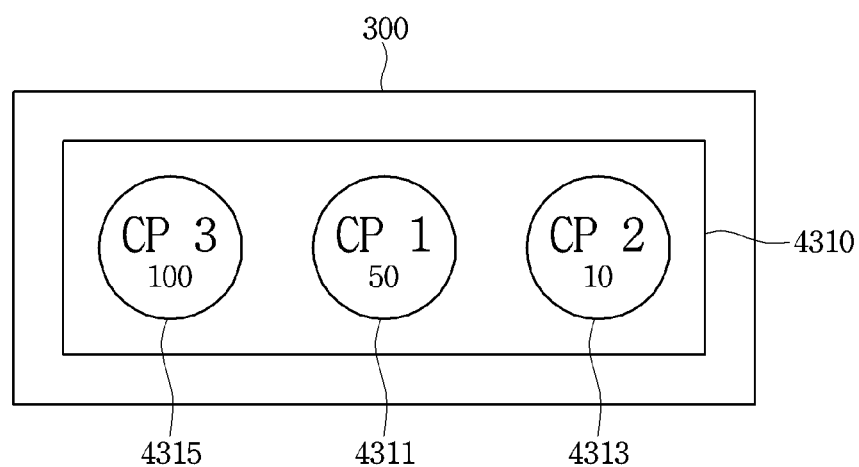

Next, FIG. 45 is described.

If media content 3334 <New Girl> is selected in the media content list region 3333 of FIG. 33, the control unit 170 may control the display unit 180 to display the content provider list 4310 on the screen 300 based on the number of accesses of the content provider, as shown in FIG. 45. The number of accesses of the content provider may be the number of executes of an application corresponding to the content provider. The control unit 170 may arrange the content providers in descending order of the number of accesses The number of accesses of the third content provider 4315 is 100, the number of accesses of the first content provider 4311 is 50, and the number of accesses of the second content provider 4313 is 10. The user may select the content provider, whose media content is to be played back, through the content provider list 4310 based on the number of accesses.

In further another embodiment, the content provider list 4310 may include only the third content provider 4315 having the largest number of accesses.

Figure 46:
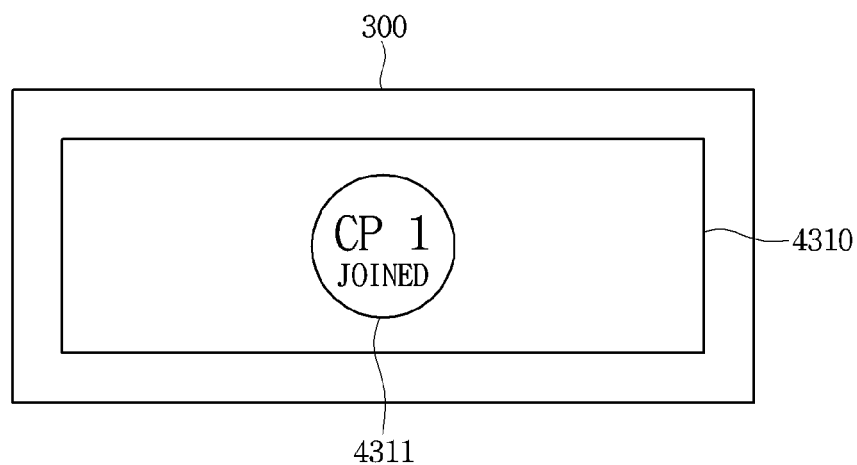

Next, FIG. 46 is described.

If media content 3334 <New Girl> is selected in the media content list region 3333 of FIG. 33, the control unit 170 may control the display unit 180 to display the content provider list 4310 on the screen 300 based on the joining or not as the content provider, as shown in FIG. 46. The control unit 170 may arrange only the content providers joined by the user in the content provider list 4310. In FIG. 46, only the first content provider 4311 is displayed in the content provider list 4310. The user may select the content provider, whose media content is to be played back, through the content provider list 4310 based on the joining or not as the content provider.

Next, FIG. 47 is described.

If media content 3334 <New Girl> is selected in the media content list region 3333, the control unit 170 may control the display unit 180 to display the content provider list 730 including the purchase price of the media content, the network speed, and the information on the number of accesses on the screen 300, as shown in FIG. 47. The user may select the content provider, whose media content is to be played back, through the content provider list 4310 based on the joining or not as the content provider.

The control unit 170 of the display device 100 may play back the media content provided through any one content provider among one or more content providers included in the content provider list (S3217).

In an embodiment, the control unit 170 may receive a request to select any one content provider on the content provider list shown in FIGS. 43 to 47, and play back media content provided through the selected content provider according to the received request.

In another embodiment, the control unit 170 may access the content provider providing the media content at the lowest purchase price and play back the corresponding media content, without displaying the content provider list.

In further another embodiment, the control unit 170 may access the content provider providing the media content at the highest network speed and play back the corresponding media content, without displaying the content provider list.

In further another embodiment, the control unit 170 may access the content provider having the largest number of accesses and play back the corresponding media content, without displaying the content provider list.

In another embodiment, the control unit 170 may access the joined content provider and play back the corresponding media content, without displaying the content provider list.

According to an embodiment, the above-described method may also be embodied as processor-readable codes on a program-recorded medium. According to an embodiment, the above-described method may be embodied as processor-readable codes in a medium on which a program is recorded. Examples of processor-readable mediums include ROM, RAM, CD-ROM, a magnetic tape, a floppy disk, an optical data storage device, and the like. If desired, the processor-readable medium may be realized in the form of a carrier wave (for example, a transmission over the Internet).

In the display devices described above, the configurations and methods of the embodiments described above are not limitedly applied, but the embodiments may be configured by selectively combining all or part of embodiments so that various modifications can be made thereto.

The invention claimed is:

1. A display device comprising:
a display unit configured to display a plurality of icons;
an input interface unit configured to receive a request from a remote control device to control the operation of the display device; and
a control unit configured to control the display unit and the input interface unit,
wherein the control unit is further configured to play a broadcast program, and if a favorites icon from among the plurality of icons is selected during playback of the broadcast program, display one or more of a favorites channel list and a favorites program list,
wherein the control unit is further configured to display the favorites channel list according to a request to select the favorites icon,
wherein the favorites channel list comprises a plurality of progress bars indicating a progress state of a program being broadcast on a corresponding channel,
wherein the favorites channel list further comprises a title of a broadcast program being broadcast on the corresponding channel,
wherein the plurality of progress bars are simultaneously displayed on the display unit,
wherein the control unit is further configured to:
display a favorites program button for providing the favorites program list if the favorites icon from among the plurality of icons is selected,
display the favorites program list including a plurality of program icons corresponding to bookmarked programs according to a selection of the favorites program button,
display a content provider recommendation list if a program icon among the plurality of program icons is selected, and
wherein the content provider recommendation list includes one or more content provider capable of providing a program corresponding to the selected program icon at a lowest price among a plurality of content providers capable of providing the program corresponding to the selected program icon,
wherein only a content provider providing the broadcast programs at a highest download or streaming speed among the one or more content provider providing the corresponding program is displayed on the content provider recommendation list, and
wherein if the corresponding program is stored in a storage unit of the display device, the corresponding broadcast program stored in the storage unit is directly played back, without displaying the corresponding broadcast program in the content provider list.

2. The display device according to claim 1, wherein the control unit is further configured to display a program addition item for adding the broadcast program being played back to the favorites program list; and
a channel addition item for adding a channel of the broadcast program being played back to the favorites channel list.

3. The display device according to claim 2, wherein the control unit is further configured to add the broadcast program to the favorites program list according to a request to select the program addition item during the playback of the broadcast program.

4. The display device according to claim 2, wherein the control unit is further configured to add the channel of the broadcast program to the favorites channel list according to a request to select the channel addition item during the playback of the broadcast program.

5. The display device according to claim 1, wherein the control unit is further configured to output a favorites list entry button for entering a favorites list according to reception of a request to select the favorites icon, and
wherein the favorites list entry button comprises:
the favorites program button; and
a favorites channel button for providing the favorites channel list.

6. The display device according to claim 5, wherein a thumbnail image corresponding to any one of programs included on the favorites program list is displayed on the favorites program button.

7. The display device according to claim 5, wherein the favorites program list further comprises a program addition icon, and
wherein each of the plurality of program icons comprises a thumbnail image corresponding to a program, and detailed information describing a program.

8. The display device according to claim 7, wherein the control unit is further configured to output a search screen for searching for a program to be added to the favorites program list according to a request to select the program addition icon.

9. The display device according to claim 5, wherein the favorites channel list further comprises a channel addition icon, and
wherein each of the plurality of channel icons further comprises a name of a corresponding channel and a channel number of the corresponding channel.

10. The display device according to claim 9, wherein the control unit is further configured to output a search screen for searching for a channel to be added to the favorites channel list according to a request to select the channel addition icon.

11. The display device according to claim 1, wherein, if a recent icon is selected from among the plurality of icons, the control unit is further configured to display information on media content recently played back.

12. The display device according to claim 11, wherein the information on the media content comprises a thumbnail image corresponding to the media content recently played back, and information identifying a source providing the media content.

13. The display device according to claim 11, wherein the control unit is further configured to display an image card including the information on the media content and a favorites register icon, and add the image card to the favorites list according to selection of the favorites register icon.

14. The display device according to claim 1, wherein, if a scroll icon is selected from among the plurality of icons, the control unit is further configured to display content provider icons and reduce sizes of the plurality of icons having been displayed.

15. The display device according to claim 1, wherein, if a pointer moving according to movement of the remote control device is located on a specific icon among the plurality of icons, the control unit is further configured to display a favorites register icon, and add the specific icon to the favorites list according to selection of the favorites register icon.

* * * * *